US006555803B1

(12) United States Patent
Bremer

(10) Patent No.: US 6,555,803 B1
(45) Date of Patent: Apr. 29, 2003

(54) METHOD AND APPARATUS FOR IMAGING A FIELD OF REGARD BY SCANNING THE FIELD OF VIEW OF AN IMAGING ELECTRO-OPTICAL SYSTEM IN A SERIES OF CONICAL ARCS TO COMPENSATE FOR IMAGE ROTATION

(75) Inventor: James C. Bremer, Silver Spring, MD (US)

(73) Assignee: Swales Aerospace, Beltsville, MD (US)

( * ) Notice: Subject to any disclaimer, the term of this patent is extended or adjusted under 35 U.S.C. 154(b) by 0 days.

(21) Appl. No.: 09/617,372

(22) Filed: Jul. 17, 2000

(51) Int. Cl.[7] .............................................. G01C 21/02
(52) U.S. Cl. ............................... 250/203.1; 250/206.1; 250/234; 359/225
(58) Field of Search ......................... 250/203.1, 203.2, 250/203.3, 203.4, 203.6, 206.1, 206.2, 208.1, 234, 235; 359/196, 214, 212, 223, 225, 429

(56) References Cited

U.S. PATENT DOCUMENTS

| 4,347,530 A | * | 8/1982 | Stetson ........................ 358/113 |
| 5,654,549 A | * | 8/1997 | Landecker et al. .......... 250/332 |
| 5,672,866 A | * | 9/1997 | Messina ............... 250/252.1 A |
| 5,909,302 A | * | 6/1999 | Guissin et al. ............... 359/225 |
| 5,936,771 A | * | 8/1999 | Cooper ........................ 359/618 |
| 6,201,232 B1 | * | 3/2001 | Carlisle .................... 250/206.2 |

OTHER PUBLICATIONS

Michael Winreb, Michael Jamieson, Nancy Fulton, Yen Chen, Joy Xie Johnson, James Bremer, Carl Smith, and Jeanette Baucom. "Operational calibration of Geostationary Operational Environmental Satellite –8 and –9 imagers and sounders" Applied Optics, Sep. 20, 1997, vol. 36, No. 27, pp. 6895–6904.

James J. Shea, "Image correction via lunar limb knife–edge OTFs" Part of the SPIE Conference on Earth Observing systems III, Jul. 1998, pp. 165–186.

James C. Bremer, "Appendix B: Scanning Technique for Advanced Geosynchronous Studies Imager: Conical Scanning to Compensate for Image", Study Report for the Advanced Geosynchronous Studies Imager, Nov. 1999, pp. B–1 to B–6.

James C. Bremer, "Imaging System With TDI and a Two–Axis–Scanning Mirror", NASA Tech Briefs, Dec. 1999, pp. 30–31.

James C. Bremer, "Scanning technique for Advanced Geosynchronous Studies Imager: conical scanning to compensate for image rotation", SPIE Conference on Earth Observing Systems IV Jul. 18, 1999, pp. 35–46.

* cited by examiner

Primary Examiner—Stephone B. Allen
Assistant Examiner—Christopher W. Glass
(74) Attorney, Agent, or Firm—Roberts Abokhair & Mardula, LLC

(57) ABSTRACT

A two-dimensional field of regard is scanned with a single plane mirror in the object space of a telescope, maintaining a fixed relationship between the rotational direction of scan and the projection of the telescope's focal plane. The two dimensional field of regard is covered by a series of conical arcs, each arc being scanned by rotation at constant angular velocity about the inner axis of the two-axis system. This scanning system accommodates applications such as TDI that require an opto-mechanical scan with a constant linear velocity (magnitude and direction) in the focal plane. Shading of IR images is mitigated by calibration at the ends of each scan line and by a scan geometry that minimizes changes in reflection angle.

16 Claims, 8 Drawing Sheets

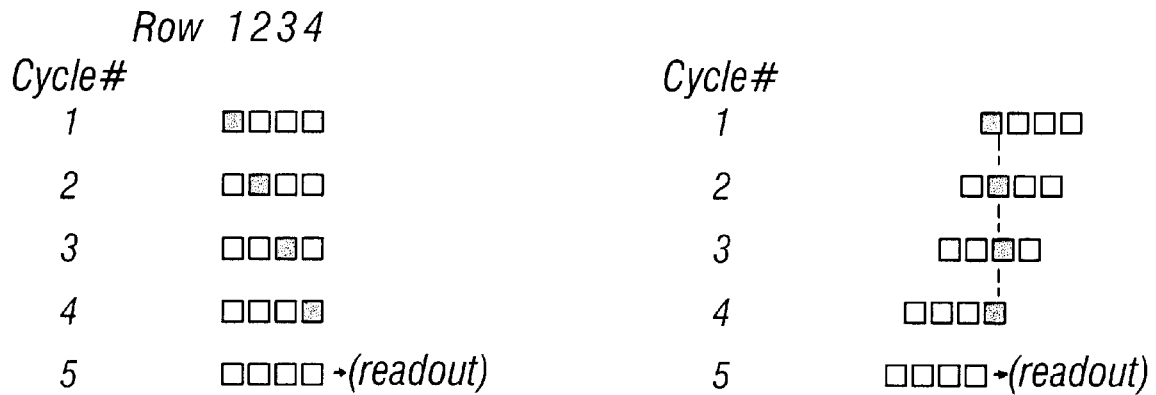
FIG. 3
(Prior Art)
FIG. 4
(Prior Art)
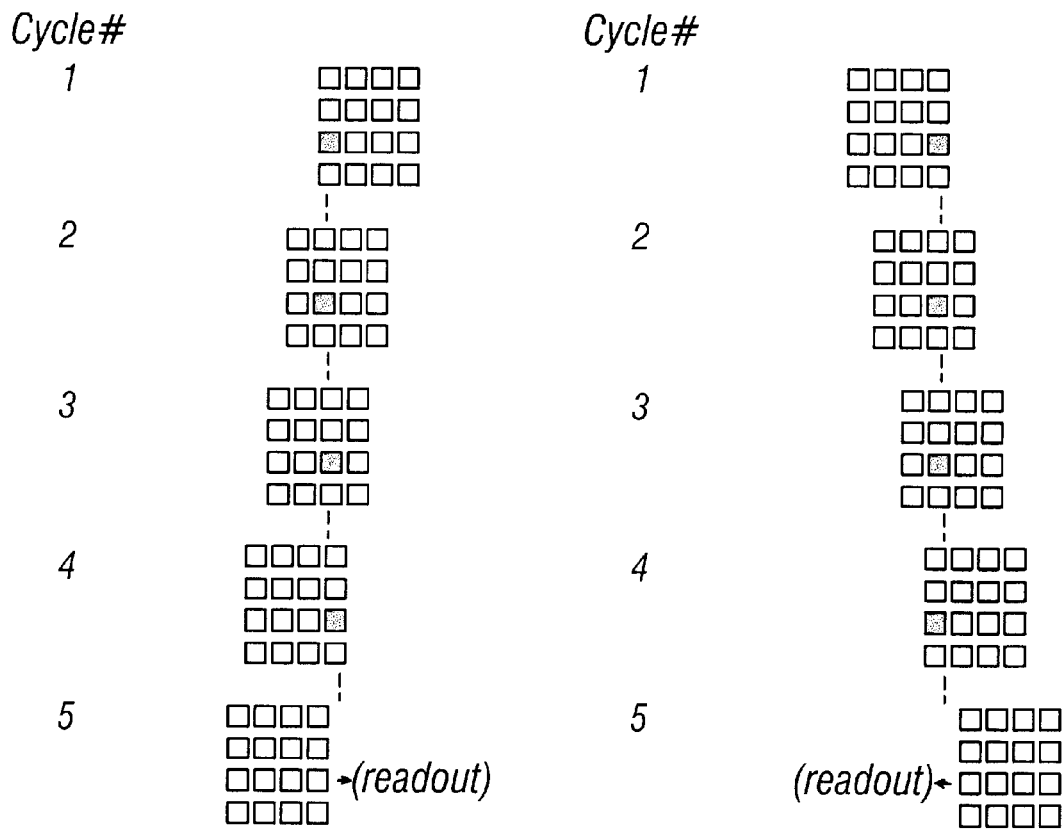
FIG. 5
(Prior Art)

METHOD AND APPARATUS FOR IMAGING A FIELD OF REGARD BY SCANNING THE FIELD OF VIEW OF AN IMAGING ELECTRO-OPTICAL SYSTEM IN A SERIES OF CONICAL ARCS TO COMPENSATE FOR IMAGE ROTATION

STATEMENT CONCERNING GOVERNMENT INTEREST

The U.S. Government has a paid-up license in this invention and the right in limited circumstances to require the patent owner to license others on reasonable terms as provided for by the terms of contract no. NAS5-32650 awarded by the National Aeronautics and Space Administration (Goddard Space Flight Center).

BACKGROUND OF THE INVENTION

1. Field of the Invention

The present invention relates generally to the field of imaging a two-dimensional field of regard. More particularly, the present invention relates to imaging of the full-Earth disk by a spacecraft that scans the field of view of an imager across the full Earth disk.

2. Background Information

One of the most common uses for artificial planetary satellites is to produce images of the planet's surface. Many Earth-orbiting satellites capture images of Earth for purposes ranging from military intelligence to weather forecasting. Orbital imaging for weather forecasting and for scientific purposes demands images of vast areas of the Earth at once.

It is common to image a planet (e.g., Earth) from space using an imaging electro-optical sensor constructed from a telescope that collects radiation from a remote source and brings it to focus on one or more focal plane arrays (FPA's) with each FPA containing many detector elements. A scanning sensor moves the image of the scene over one or more FPA'S, each FPA usually having many detector elements perpendicular to the direction of the scan motion. Each element converts the radiation from an instantaneous field of view (IFOV) in the scene into an electronic signal. The image of the scene in the spectral band of the sensor is reconstructed from these electronic signals.

The angular field of view (FOV) of the telescope multiplied by its effective focal length (EFL) equals the dimensions of the telescope's focal plane, which contains the FPA. For application in which an imaging sensor must cover a two-dimensional field of regard (FOR) that exceeds the telescope's FOV, a plane scan mirror may be located in front of the imaging sensor's telescope to scan the FOV across the FOR. For example, the Earth subtends a circle approximately 17.4° in diameter from geosynchronous altitude. An instrument that is capable of imaging the full-Earth disk must have a field of regard (FOR) that not only includes this full-Earth disk, but also allows it to view deep space to measure the background signal in each channel. Most multispectral instruments that image the Earth from this altitude use a large, reflective telescope with a field-of-view (FOV) that is much smaller than the required FOR. A two-dimensional raster scanning procedure is required to cover the FOR, and is usually implemented with a plane mirror in front of the telescope's aperture.

A number of geosynchronous weather satellites, including the EUMETSAT and GOES-1 through GOES-7 satellites, are "spinners" that rotate about the north-south axis. The imager on each of these spinning satellites has a telescope that is aligned with the north/south axis of the spacecraft. A plane mirror with a single rotational axis, perpendicular to the spin axis, reflects the optical axis of the telescope towards the Earth. The spacecraft's rotation scans the line of sight (LOS) in the east/west direction. To form a two-dimensional map of the Earth, the plane mirror is only required to step in the north/south direction. The main disadvantage of a spinning satellite is that it only allows the imager to view the Earth's surface for less than 5% of its total duty cycle.

Beginning with GOES 8, the geostationary weather satellites operated by the United States (developed for NOAA by LORAL with instruments from ITT) have been three-axis stabilized. In this configuration, the imager continuously points toward the Earth, permitting it to operate at a high duty cycle and to be far more flexible than a spinning satellite in imaging arbitrary areas of the Earth's surface. These prior art GOES imagers routinely produce 3000 km by 5000 km images of the contiguous United States (CONUS) and 1000 km by 1000 km images of severe storms. Scanning is performed by a plane scan mirror mounted on a two-axis gimbal. Rotation of this mirror about the inner gimbal axis scans the LOS in the east/west direction. Between scan lines, incremental rotations about the outer gimbal axis move the LOS from north to south. When scanning the Equator, the GOES imager projects its detector arrays onto the Earth's surface in the optimal manner, with the cross-scan axis of each detector array (its long axis) projected in the north-to-south direction. When scanning north of the Equator, the projection of this axis is tilted in the northeast-to-southwest direction; when scanning south of the Equator, the projection is tilted northwest-to-southeast. The tilt angle varies from zero at the Equator to 8.7° at the North and South Poles. This phenomenon, known as image rotation, is an intrinsic problem in a two-axis scanning system that uses a single scan mirror in object space. See J. J. Shea, "Image correction via lunar limb knife-edge OTF's", *Proc. SPIE, Earth Observing Systems III*, vol. 3439, Jul. 19–21, 1998, pp 165–186.

Referring to FIG. 1, the geometric configuration of the GOES 8 & 9 imager is illustrated. The GOES convention for spacecraft coordinates is portrayed by a set of orthogonal coordinates 10 wherein +x=east, +y=south, and +z=nadir. For simplicity of illustration, the GOES telescope is represented as a single lens 12 and crossed axes 14 represent the image as presented at the focal plane array. Note that the lens 12 inverts the image of the axes 14. The telescope's optical axis 16 points due east along the x-axis. The scan mirror 18 is an optical flat with an elliptical cross section and has a reflective surface (not visible from the viewpoint of FIG. 1) that directs light from the Earth (shown in phantom) into the telescope 12. The scan mirror 18 is mounted on a first axle 20 that provides an inner axis of rotation with respect to which the inner gimbal angle (iga) is measured. The inner axis of rotation is coincident with the short dimension of the ellipse and perpendicular to the normal vector of the mirrored surface. The first axle 20 permits the scan mirror 18 to rotate about the inner axis of rotation with respect to a yoke 22. The yoke 22 has a second axle 24 that is perpendicular to the first axle 20. The second axle 24 lies along the extension of the optical axis 16 of the telescope 12, along the x-axis, and allows the yoke 22 to rotate about this outer axis of rotation that is fixed with respect to the telescope 12, and with respect to which the outer gimbal angle (oga) is measured. The orientation of the first axle 20 always remains perpendicular to the x-axis, but rotates in the y-z plane when the yoke 22 is pivoted about the second axle 24.

Referring to FIG. 2, projections 42, 44, 46, 52, 54, 56 of the crossed axes in the focal plane 14 onto the Earth's surface 30 are illustrated. The line with the arrowhead 14' is parallel to the z-axis and corresponds to the along-scan direction of the array. The line with the circle 14" is parallel to the y-axis and corresponds to the cross-scan direction of the array.

The intersection of the crossed axes is projected onto the equator 32 when the position of the yoke 22 on the outer axle 24 aligns the inner axle parallel to the y-axis. This angle can be defined as the home position of the outer axle, at oga=0. When the outer axle 22 is fixed at this position and the scan mirror 18 is rotated about its inner axle 20, the projection 42, 44, 46 of the focal plane 14 is scanned along the equator 32. The y-axis of the focal plane remains perpendicular to the direction of the scan and the z-axis of the focal plane is projected along the direction of scan.

When the yoke 22 is rotated about the outer axle 24 in the +oga direction, the crossed axes in the focal plane 14 are projected 52, 54, 56 into the Northern Hemisphere. The array's projection 52, 54, 56 rotates clockwise, as viewed from space. When the oga remains fixed and the scan mirror 18 is rotated about the inner axle 20, the z-axis of the focal plane is no longer projected along the direction of scan but it is tilted away from this position by an angle equal to oga, reaching an angle of 8.7 at the North and South poles. When the oga<0 (not shown), the focal plane 14 is projected into the Southern Hemisphere with a counterclockwise rotation equal to the magnitude of the oga.

The GOES 8 and GOES 9 imagers scan the Earth in a series of alternating east-to-west and west-to-east lines proceeding from North to South. The GOES 8 and 9 imagers only maintain the optimal relationship between the direction of the opto-mechanical scan and the orientation of the array when they scan the equator. However, rotation of the mirror about a second axis rotates the projection of the focal plane onto the Earth's surface. This is a disadvantage of the prior art because it precludes use of a resolution enhancing technique known as Time Delay and Integration (TDI). The fundamental aspects of TDI technique are explained as follows, along with an explanation of why TDI is incompatible with the prior art systems that suffer from image rotation.

TDI is a prior art technique in which a two-dimensional detector array is scanned like a linear array. TDI achieves the angular resolution of a single detector element in the array combined with a dwell time that is N times longer, where N is the number of columns in the along-scan direction. Referring to FIG. 3, TDI is illustrated, showing the projection of a 4×4 array onto object space, with the solid square, ■, representing a single charge packet. One each cycle, the charge packet in each detector element of the array accumulates photo-electric charges generated by absorption of radiation from the scene and is then transferred to the detector element in the same row that lies immediately to its right. The column on the far right of the array is also read out at the end of each cycle. At the end of cycle 4, the charge packet represented by the solid square contains the sum of the charges accumulated by the four detector elements in the second row: column: #1 (the far left column) in cycle 1, column #2 in cycle 2, column #3 in cycle 3, and column #4 in cycle 4.

The opto-mechanical scan motion of the LOS must be coordinated with the electronic scan of the charge packets so that the LOS from each charge packet corresponds to a single pixel in object space. The linear velocity of the electronic scan, from the leading edge to the trailing edge of the array, must match the linear velocity of the opto-mechanical scan. Referring to FIG. 4, the projection of the row or detector elements in object space is illustrated, where the right-to-left opto-mechanical scan cancels the left-to-right electronic scan, so that the image of a charge packet remains at a fixed angle in object space, corresponding to a fixed IFOV on the Earth's surface. The effective dwell time is equivalent to the dwell time of a single IFOV multiplied by N (N=4 in this example), so that radiometric signal-to-noise ratio (SNR) is enhanced by a factor of $N^{1/2}$ (2 in this example) in comparison to a single column FPA scanned at the same opto-mechanical rate.

The goal of TDI is to accumulate all of the photo-electric charges in each charge packet from the same instantaneous field of view (IFOV) on the Earth's surface. To achieve this condition, the LOS of the present invention is scanned opto-mechanically so that the projection of the array moves horizontally, from left-to-right, with its velocity parallel to the rows of the array. At the same time, the array is electronically scanned so that a charge packet moves along each row from right-to-left. The electronic and opto-mechanical scan vectors are substantially equal in magnitude and opposite in direction to maintain image quality.

To achieve the desired match between opto-mechanical and electronic scans, two conditions need to be satisfied for all scan angles within the FOR. Ideally, the projection of the TDI axis of each FPA onto the Earth's surface must always lie along the direction of the opto-mechanical scan. Without this provision, the pixels in the image will be blurred in the cross-scan direction. Also according to the ideal case, the angular scan speeds of the LOS due to the electronic scan and the optical rate and the scan rates must be also equal. Without this provision, the pixels will be blurred in the along-scan direction. If both of these conditions are satisfied, then the outputs from the array will have the angular resolution as a single detector element but an effective dwell time per pixel equal to N times the integration period of a single cycle, where N is the number of columns summed in the TDI (N=4 in the illustrated example).

Thus, in order to obtain the potential advantages of the TDI technique, the image rotation problem of the above-described prior art imaging system needs to be solved.

Another problem with the prior art has to do with how errors are inherently introduced across each scan line by variations in emissivity of the scan mirror. The GOES imager measures its IR background by viewing deep space on one side of the Earth's surface at the end of each scan line. This background is subtracted from the raw scene measurements to determine the net radiance from the scene. Unfortunately, the emissivity of the GOES imager's scan mirror varies as a function of the angle of incidence and this angle of incidence varies by about 9.5° on each scan line. Because the background from the scan mirror is not constant during a scan line, the raw data exhibits east/west shading with errors of several degrees Kelvin in data from the Earth's surface. The error caused by this variation in emissivity over a single scan line is reduced, but not eliminated, by calibration. See M. Weinreb, et. al, "Operational calibration of Geostationary Operational Environmental Satellite-8 and -9 imagers and sounders", *Applied Optics*, vol. 36, no. 27, Sep. 20, 1997, pp 6895–6904.

Referring to FIG. 5, the projection of a 2-D FPA into object space on alternate scan lines in a bi-directional scan is illustrated. The FPA is fabricated with a read-out column on each side of the active photo-detector array. Reversing the phasing of their charge-coupled transfer reverses the direction of motion of the charge packets in a row. These bi-directional TDI arrays permit bi-directional scanning, so the end of one scan line in an image can be in close angular proximity to the beginning of the next scan line. Between these two scan lines, both the opto-mechanical and electronic scan directions along the TDI axis must be reversed and the optical LOS must be offset in the cross-scan direction by an angle equal to (or slightly less than) the cross-scan angular subtense of the array.

There are other applications beside TDI that require that a sensor's opto-mechanical scan motion to lie along a fixed axis of a focal plane. For example, a multispectral scanner may have a focal plane that contains a series of linear FPA's, arranged as columns in the focal plane, each with a unique spectral filter. To achieve co-registration among corresponding detector elements in several spectral channels, the same IFOV in the image must be scanned over the corresponding detector element in each FPA.

In prior scan mirrors on gimbal systems, including the GOES 8/9 imager, there is a variable relationship between the direction of scan produced by rotation about a single axis and the projection of the axes of the focal plane. In order to scan the image at a constant velocity (speed and direction) in the focal plane, it would be necessary to perform simultaneous, coordinated scanning at variable rates about the two gimbal axes. The outer gimbal must be capable of scanning over the full range of angles required to cover the FOR, continuously or in increments that are small in comparison to the IFOV of the sensor.

When the mirror is rotated about its inner axis, it changes the moment of inertia of the mass that is being rotated about the outer gimbal axis. Also, the outer gimbal axis cannot be a principal axis of the system for all mirror angles unless the mirror motion is compensated by a counter-rotating mass.

In most gimbal implementations, the outer gimbal must support the motor that drives the inner gimbal's rotation as well as an encoder or a resolver to make precision measurements of the inner gimbal's angle. Electric power and signals must be transferred cross the outer gimbal axis (e.g., by flexible cable or slip ring), increasing the rotational friction about the outer gimbal axis. Since highly accurate pointing is required, it is difficult to implement the necessary scan pattern by simultaneous rotations about both axes during the active portion of the scan.

Thus, what is needed is a scanning imager that avoids the problem of image rotation so that TDI may be effectively used. What is also needed is a scanning imager that has a reduced variation in emissivity of the scanning optics across each scan line. What is also needed is a scanning mechanism that requires rotation about only one axis, preferably the inner axis, during the data-taking portion of the scan pattern.

SUMMARY OF THE INVENTION

The subject invention is a method and apparatus for scanning a two dimensional field of regard with a single plane mirror in the object space of a telescope, maintaining a fixed relationship between the rotational direction of scan and the projection of the telescope's focal plane. The two dimensional FOR is covered by a series of conical arcs, each arc being scanned by rotation at constant angular velocity about the inner axis of the two-axis system. This scanning system can accommodate applications such as TDI that require an opto-mechanical scan with a constant linear velocity (magnitude and direction) in the focal plane.

Shading of IR images is particularly hard to correct because the observed radiance has a component that varies with both the temperature of the scan mirror and its reflection angle. Calibration measurements, determined by viewing a source of known radiance, can mitigate this problem, but the time between calibration and scene measurements must be as short as possible or the calibration will be degraded by thermal drifts and 1/f noise in the detector and electronics.

In the subject invention, the reflection angle's dependence of the rotational angle reaches a minimum at the center of each arc in the FOR, and exhibits only a slow, quadratic increase towards each end of the arc as a the scan mirror is rotated about the inner gimbal's axis. The large variations in scan angle occur between arcs rather than within an arc. In the geosynchronous imager application, measurements of dark space, taken at the ends of the scan line, are used to subtract the instrument's background from the raw signals. The space measurements taken on each side of each arc may be used for calibration of that arc, mitigating the shading problem. It is also an option to place one or more calibration sources, such as blackbodies with precision temperature-monitoring apparatus, in positions where they can be viewed between scan lines.

The only rotational motion during the active arc scanning is the rotation of the mirror at a constant angular velocity about its principal axis of minimum angular momentum. Because the outer axis of rotation remains fixed during the active portion of the scan, dynamic errors (jitter) in the outer gimbal's rotation and cross-coupling between the rotational motions about two axes are eliminated. Because the angular velocity is constant, torque disturbances due to angular acceleration about the inner axis are also eliminated during the active portion of the scan. All of these factors tend to reduce or eliminate errors in the pointing accuracy of the system.

Between these arcs, the orientation of this inner axis is offset by rotation about the outer gimbal axis. The outer gimbal needs only to be capable of holding a small number of fixed positions, with the mechanical angle between positions no greater than one-half of the optical width (cross-scan) of the scanned arcs. These factors tend to simplify the apparatus required to measure and control the rotational angle of the outer axis. The position of the outer gimbal must be-known to the same level of accuracy as that of the inner gimbal, however. The angular velocity of the mechanical scan is held constant during any given arc. However it is preferable to change the angular velocity from arc-to-arc, in order to maintain the same optical scan rate for each arc.

It is an object of the present invention to provide a scanning imager that avoids the problem of image rotation so that the along-scan and cross-scan axes of the scan pattern correspond to fixed axes in the focal plane throughout the field of regard.

It is also an object of the present invention to provide a scanning imager that substantially eliminates image rotation so that TDI may be effectively used.

It is another object of the present invention to provide a scanning imager that has a reduced variation in emissivity of the scanning optics across each scan line.

It is yet another object of the present invention to provide a method for scanning an imager that compensates for the problem of image rotation.

It is still another object of the present invention to provide an imaging satellite that images a planet's surface while compensating for the problem of image rotation.

It is a further object of the present invention to provide a scanning imager that allows for effective co-registration among multiple detector arrays.

It is an additional object of the present invention to provide a scanning imager that permits multi-spectral imaging using multiple detector arrays.

It is another object of the present invention to provide a scanning imager that permits hyperspectral imaging.

It is also an object of the present invention to provide a scanning imager that allows the outer axis of a two-axis scanning gimbal to remain stationary during the data-taking portion of the scan pattern.

Some of the above objects are achieved by a method of scanning a field of view of an imager across a field of regard using a scan mirror mounted on a gimbal having an inner axis and an outer axis. The method includes sweeping the field of view across the field of regard in a selected direction by rotating the gimbal about the inner axis while maintaining the gimbal at a fixed angle with respect to the outer axis. The method further includes progressing to a subsequent scan position by rotating the gimbal about the outer axis by a predetermined increment angle while maintaining the gimbal at a fixed angle with respect the inner axis, Additionally, the method includes repeating the act of sweeping such that the selected direction is chosen alternately from a first direction and a second direction that is opposed to the first direction. The method further includes repeating the act of progressing prior to each repeated act of sweeping, wherein there is substantially no rotation, with respect to the instantaneous direction of scan, of an image formed on the imager.

Others of the above objects are achieved by an apparatus for scanning a two dimensional field of regard. The apparatus includes a telescope having a focal plane and a field of view, and one or more image sensors disposed at the focal plane. It also includes a single optically flat mirror disposed in the object space of the telescope, wherein the flat mirror scans the field of view across the field of regard while maintaining a fixed relationship between the rotational direction of scan and the projection of the telescope's focal plane.

Some of the above objects are obtained by an apparatus for imaging a two dimensional field of regard. The apparatus includes an imager having a field of view along a line of sight, the field of view being substantially smaller that the field of regard, as well as a scan mirror disposed so as to cast the line of sight onto the field of regard. The scan mirror causes the line of sight to be scanned across the field of regard in a conical arc.

BRIEF DESCRIPTION OF THE DRAWINGS

Additional objects and advantages of the present invention will be apparent in the following detailed description read in conjunction with the accompanying drawing figures.

FIG. 3 illustrates Time Delay and Integration, a prior art technique, showing the projection of a 4×4 flat panel array.

FIG. 4 illustrates Time Delay and Integration for a 4×4 array where the right-to-left opto-mechanical scan cancels the left-to-right electronic scan.

FIG. 5 illustrates the projection of a 2-D FPA into object space on alternate scan lines in a bi-directional scan.

DETAILED DESCRIPTION OF THE INVENTION

The scanning technique proposed here mitigates the three problems discussed above by scanning a series of arcs across the FOR so that the opto-mechanical scan velocity (magnitude and direction) as projected into the focal plane, remains constant during the active scan. Each arc is scanned by rotation at constant angular velocity about the inner axis of a two-axis gimbal system while the outer gimbal axis remains fixed. Between arcs, the direction of rotation about the inner axis is reversed and the angle of the outer axis is offset. Reference measurements of dark space may also be taken during this turn-around interval, at reflection angles that are very close to the reflection angles of the preceding and following arcs. Alternatively, one or more calibration sources, such as infrared blackbodies with precision temperature measurement, may also be placed in positions where they do not vignette the FOR, but where they can be viewed during the interval between consecutive arcs.

Figure 6:
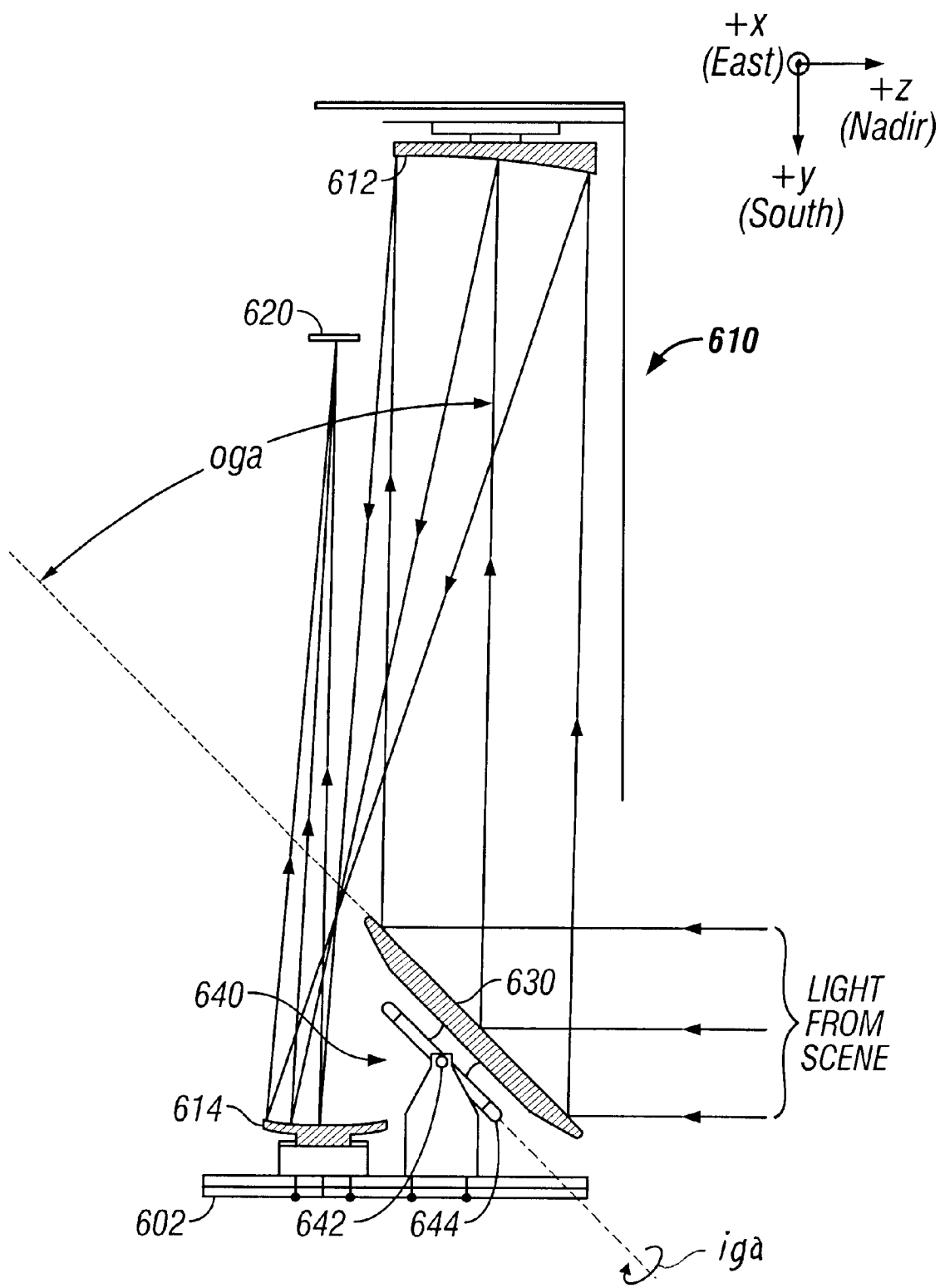
FIG. 6 illustrates an opto-mechanical system according to an embodiment of the present invention for implementing a scan pattern across the full Earth disk from geostationary orbit.

Referring to FIG. 6, an opto-mechanical system according to an embodiment of the present invention for implementing a scan pattern across the full Earth disk from geostationary orbit is illustrated. The primary mirror 612 and secondary mirror 614 form a telescope 610 with its line-of-sight (LOS) pointing south, in the +y direction, I=[0, +1, 0]. The along-scan axis of the FPA 620 is parallel to the E/W axis of the spacecraft (x-axis) and the cross-scan axis is parallel to the zenith/nadir axis (z-axis).

The scan mirror 630 is an optical flat with an elliptical cross-section that is mounted on a gimbal system 640 with two perpendicular axles 642, 644. The outer axle 642 is attached to the body 602 of the instrument parallel to its x-axis and perpendicular to the LOS of the telescope. The projection of the cross-scan axis of the FPA 620 onto the scan mirror 630 is always perpendicular to the outer axle 642 of the gimbal. The outer gimbal axle 642 is parallel to the TDI axis of the FPA 620. The inner axle 644 of the gimbal 640 rotates about the x-axis of the spacecraft due to rotation about the outer axle 642 and assumes different orientations in the y/z plane. The scan mirror 630 is attached to the inner axle 644 with the normal vector of its mirrored surface perpendicular to the inner axle 644. The major axis of its elliptical cross-section is parallel to the inner axle 644.

In its home position, the scan mirror's normal vector points 45 degrees north and 45 degrees towards nadir, N=[0, −0.707, +0.707], and the telescope's line of sight, I=[0, +1, 0], is reflected toward the center of the Earth's disk, at nadir, R=[0, 0, +1].

An arc is scanned across the Earth's disk by holding the outer axle 642 of the gimbal 640 in a fixed position and rotating the scan mirror 630 about the inner axle 644 at a constant angular velocity. At the end of a scan line, the scan mirror/inner axle assembly is rotated about the outer axle 642 while the direction of rotation about the inner axis is reversed. The direction of TDI motion on the FPA 620 is also reversed.

Figure 7:
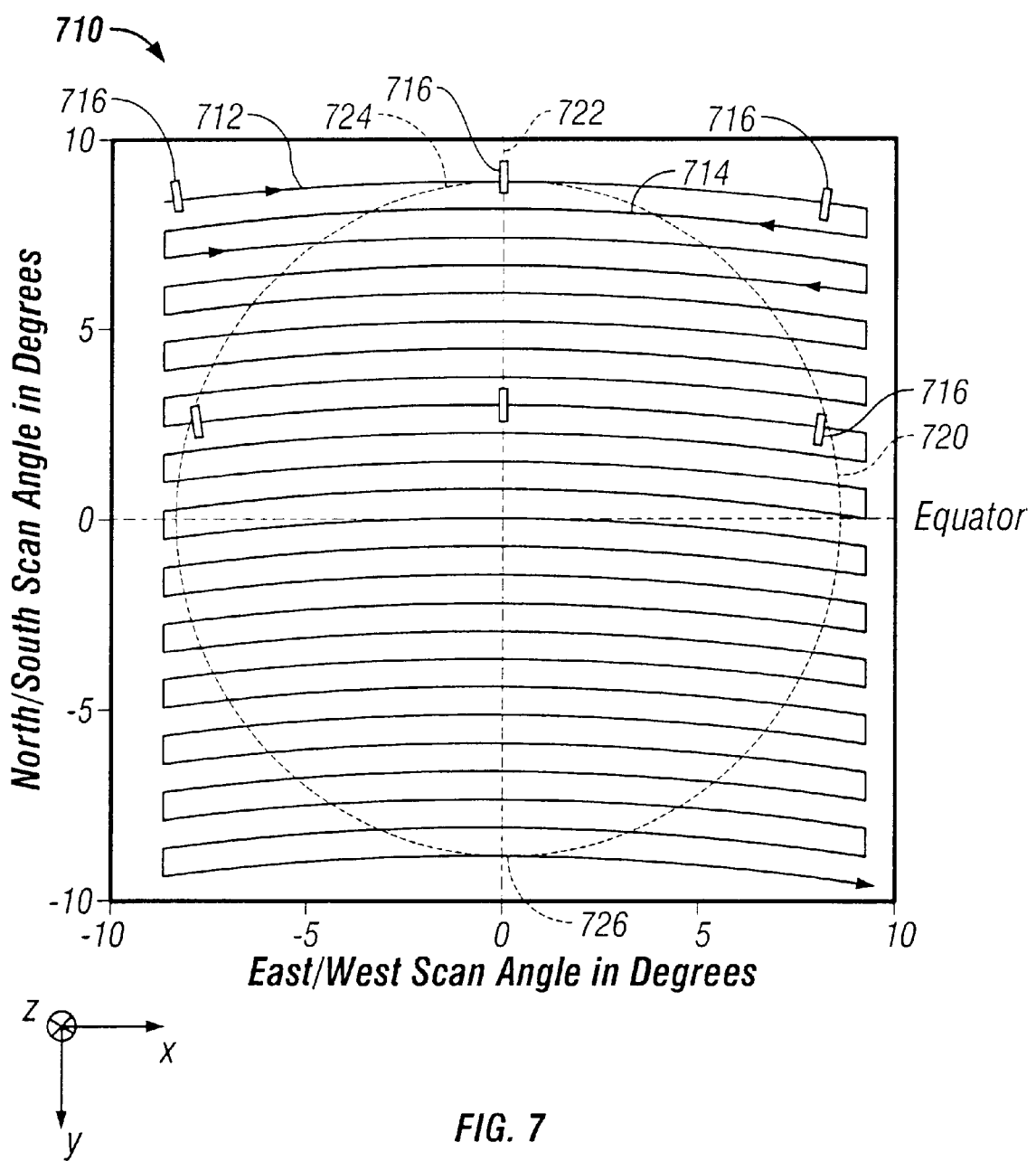
FIG. 7 illustrates a bi-directional scan pattern for mapping the full Earth disk that is generated by the system of FIG. 6.

Referring to FIG. 7, a bi-directional scan pattern 710 for mapping the full Earth disk 720 that is generated by the system of FIG. 6 is illustrated. The scan pattern 710 consists of alternating west-to-east and east-to-west arcs, proceeding from north-to-south, with an angle of 0.75 degrees between consecutive arcs, on the central meridian 722, between the North Pole 724 and South Pole 726. Projections 716 of FPA pixels at various scan positions are shown. The nominal cross-scan dimension of the instrument's FOV is 0.8 degrees in this example. Thus, this scan pattern 710 produces some overlap between adjacent arcs.

To scan the first arc 712 in this pattern, the scan mirror/inner axle assembly is slewed away from its home position by rotating 4.5 degrees counterclockwise (refer to FIG. 6) about the outer axle 642, so that the scan mirror's normal vector points 49.5 degrees northward and the angle of reflection of the telescope's LOS from the mirror is 40.5 degrees. The mirror 630 is then rotated approximately 6 degrees about the inner axle 644 so that it points 9 degrees west of the central meridian. The outer axle 642 is held stationary and the mirror 630 is rotated about the inner axle 644 of the gimbal 640 at a constant angular velocity, causing the reflected LOS to scan from west-to-east. The image of the FPA rotates so that the projection of its TDI axis remains along the direction of motion.

At the end of the first arc 712, scan mirror/inner axle assembly is rotated about the outer axle 642 by 0.375 degrees clockwise about the x-axis, causing the reflected LOS of the second arc 714 to be 0.75 degrees further south than the first arc 712 on the central meridian 722. The direction of rotation about the inner axle 644 is reversed, causing the second arc 714 to scan from east-to-west. At the end of each scan line, the angle of outer axle 642 is incremented by 0.375 degrees clockwise and the direction of rotation about the inner axle 644 is reversed. FIG. 7 shows a sequence of 25 arcs covering the full-Earth disk 720 with a series of "frowns." The angular velocity of the LOS is predominately eastward or westward, but it initially has a small northward component that vanishes when the arc crosses the central meridian and then turns southward in the second half of the arc.

Reference measurements are made at the beginning and the end of each arc, while the LOS is pointing to space. The reflection angle from the scan mirror reaches a minimum at the center of each arc in the FOR. It exhibits only a slow, quadratic increase towards each end of the arc (the eastern and western sides of the Earth's disk) as the scan mirror is rotated about the inner gimbal's axis. The large variations in scan angle occur between arcs rather than within an arc. In this geosynchronous imager embodiment, measurements of dark space are used as references to subtract the instrument's background from the raw signals. The time interval between reference and scene measurements is short, minimizing degradations caused by thermal drifts and 1/f noise.

The only rotational motion during the active arc scanning is the rotation of the mirror at a constant angular velocity. Because the outer axis of rotation remains fixed during the active portion of the scan, dynamic errors (jitter) in the outer gimbal's rotation and cross-coupling between the rotational motions about two axes are eliminated. Because the angular velocity is constant, torque disturbances due to angular acceleration about the inner axis are also eliminated during the active portion of the scan. All of these factors tend to reduce or eliminate errors in the pointing accuracy of the system.

The outer axis of the gimbal 642 needs only to be capable of holding a small number of fixed positions, with the mechanical angle between positions no greater than one-half of the cross-scan angle of the FOV of the optical system. These factors tend to simplify the apparatus required to measure and control the rotational angle of the outer axis. It is preferable that the position of the outer axis of the gimbal be known to the same level of accuracy as that of the inner axis of the gimbal.

Optical Geometry

Figure 8:
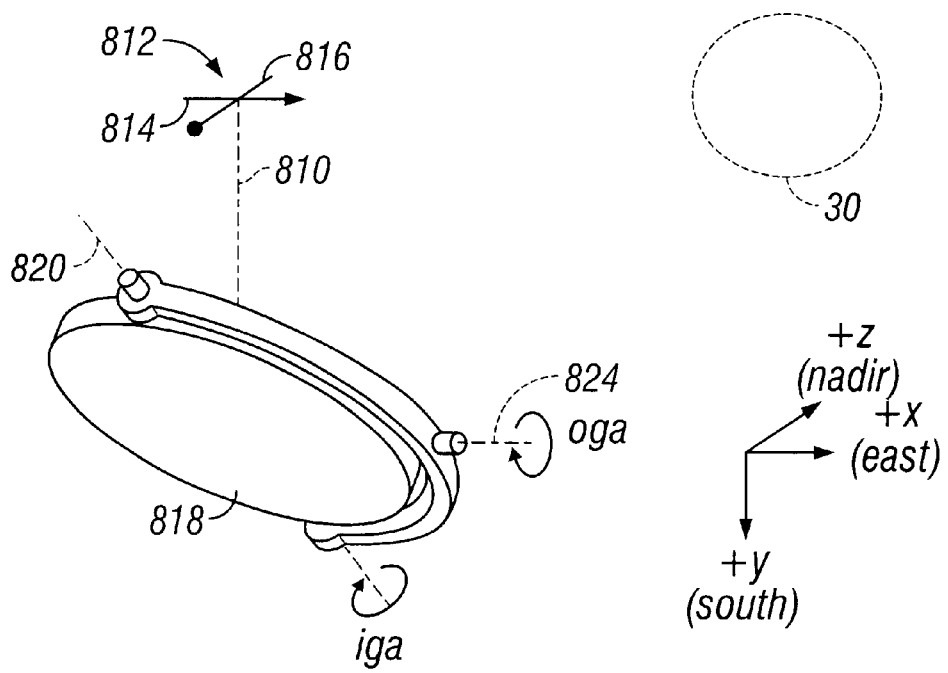
FIG. 8 illustrates a schematic view of the geometric configuration of scanning optics for the system of FIG. 6.

Referring to FIG. 8, a schematic view of the optical geometry for the embodiment of FIG. 6 is illustrated. The coordinate axes are: +x=east, +y=south, +z=nadir. The telescope's optical axis 810 points south, in the +y direction. Its focal plane 812 coincides with the x-z plane of the spacecraft. The TDI axis 814 of the FPA, indicated by the arrow in the focal plane, is aligned to the x-axis. The cross-scan axis 816 of the FPA, indicated by the "lollypop," is aligned to the z-axis of the focal plane. Optionally, the satellite performs a yaw flip at each equinox, so the telescope points north, the +x-axis points west and the +y north for six months of the year. At nadir, the cross-scan axis 816 of the FPA is projected in the north/south direction and the TDI axis 814 is projected in the east/west direction.

Figure 1:
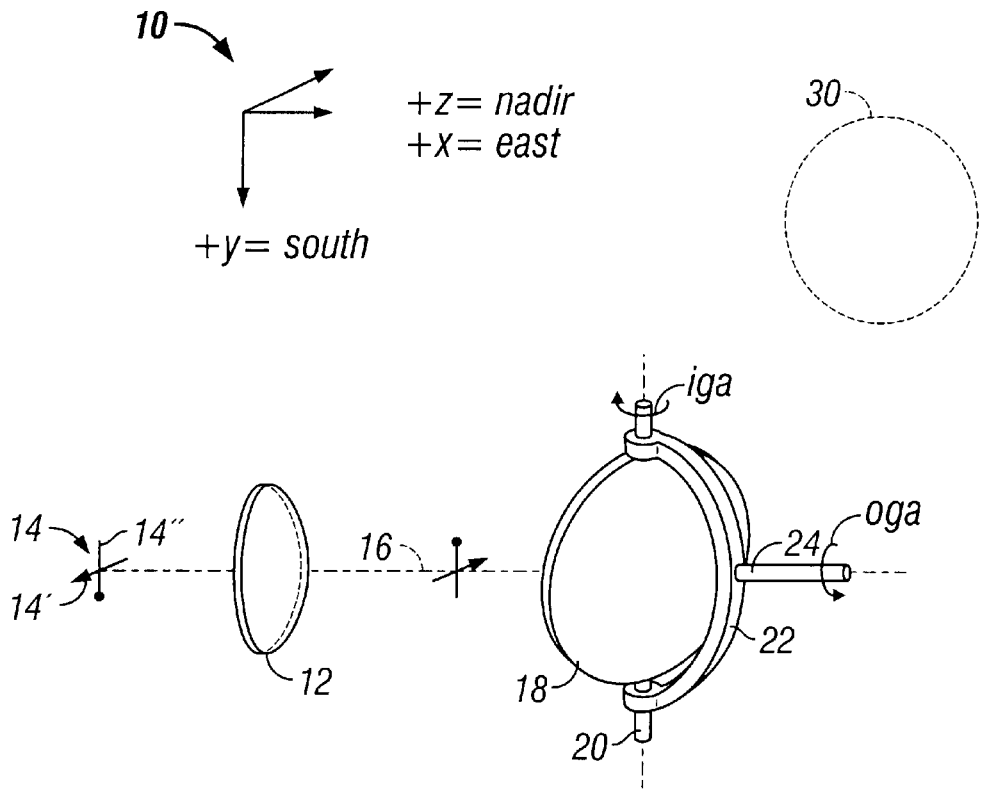
FIG. 1 illustrates a schematic view of the geometric configuration of the prior art scanning optics for a GOES 8 & 9 imager.

The optical geometry of FIG. 8 may be compared with the prior art illustrated in FIG. 1. Both figures use the same coordinate convention, +x=east, +y=south, +z=nadir. In both figures, the outer axis of the gimbal is parallel to the x-axis of the inner axis of the gimbal has a variable orientation perpendicular to the x-axis. Both systems scan a FOR that includes the Earth's surface as viewed from geostationary orbit by scanning alternate lines from east-to-west and west-to-east and by stepping from north-to-south between scan lines. In both cases, the scan lines are implemented by rotation of the scan mirror about its inner axis and the north to south steps are implemented by rotation of the yoke about the outer axis of the gimbal system during the time interval between scan lines.

The orientations of the telescopes differ between the two figures. In FIG. 1, the optical axis of the telescope points east, parallel to the +x axis, but in FIG. 8, the optical axis of the telescope points south, parallel to the +y axis. In both cases, the angle of reflection of the telescope's axis from the scan mirror is 45 degrees when the FPA is projected toward nadir. In both cases, the scan mirror is an optical plane mirror with an elliptical cross-section. In FIG. 1, the inner axis of rotation coincides with the minor axis of the ellipse. In FIG. 8, the inner axis of rotation coincides with the major axis of the ellipse.

FIG. 8 may also be compared with FIG. 6. These two figures show different embodiments of the scan mirror's gimbal system. Whereas the gimbal system of FIG. 6 is fixed to the backside of the scan mirror, the gimbal system of FIG. 8 uses a yoke around the scan mirror. The embodiment of FIG. 8 allows the center of rotation (the intersection of the two gimbal axes) to lie on or close to the surface of the mirror. This condition is desirable to minimize the size of the scan mirror and to use the same area on the scan mirror for all measurements. The embodiment of FIG. 6 eliminates the bulky yoke and its accompanying inertia. The orientation of the axes of the gimbal with respect to the x-y-z axis system of the spacecraft, and with respect to the telescope, is the same in both embodiments.

Figure 2:
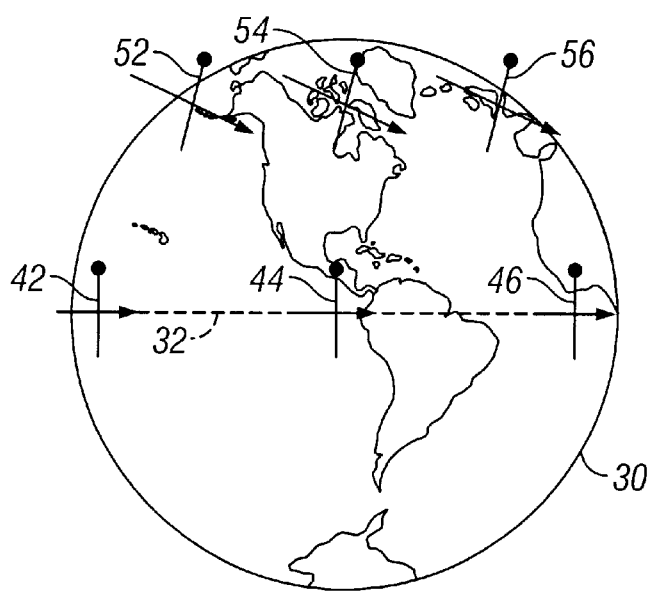
FIG. 2 illustrates projection of flat panel arrays onto the surface of the Earth according to the prior art imager illustrated in FIG. 1.
Figure 9:
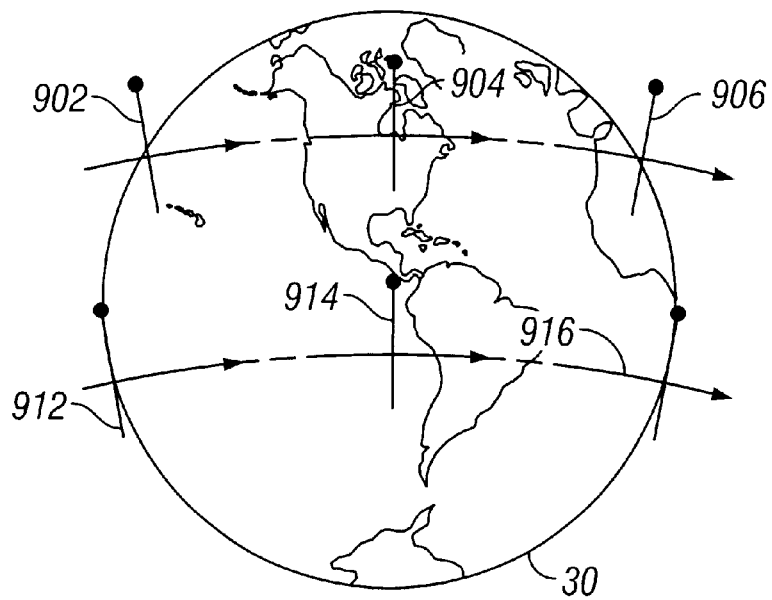
FIG. 9 illustrates projection of flat panel arrays onto the surface of the Earth according to the scanning optics illustrated in FIG. 8.

Referring to FIG. 9, projections 902, 904, 906, 912, 914, 916 of the crossed axes in the focal plane onto the Earth's surface 30 are illustrated. The image rotation as is illustrated by the TDI axes of each projection is compensated by the geometry of the arcs so that the along scan axis of the focal plane remains aligned with the direction of the scan over the entire FOR. This is in stark contrast to FIG. 2 which illustrates the mis-alignment between the scan direction and the focal plane array due to image rotation in the scan line across the North Pole according to the prior art. FIGS. 2 and 9 both illustrate FPA projections of two scan lines: one at the Equator, and another near the North Pole.

The curvature of the scanning arcs has been exaggerated in FIG. 9. The actual scan pattern is illustrated in FIG. 7.

Analysis of Arc Scanning Motion

Figure 10:
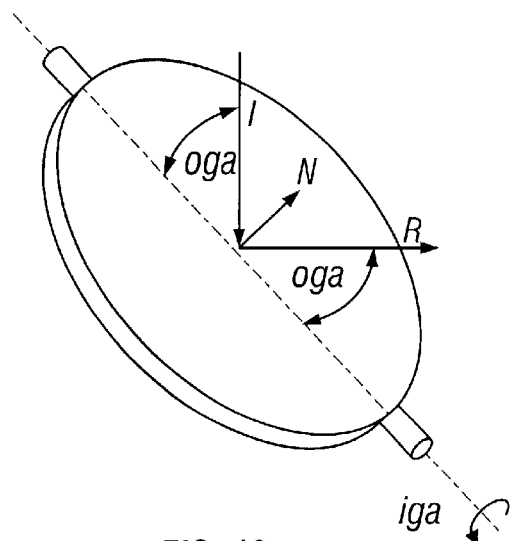
FIG. 10 illustrates pointing geometry for arc scanning according to the embodiment of FIGS. 6–9.

Referring to FIG. 10, vectors I, N, and R relevant to the pointing geometry for arc scanning according to the embodiment of FIGS. 6–9 are illustrated. The following analysis explains how the scan is coordinated with TDI in the focal plane.

The entire focal plane, with several FPA's that scan in sequence along an arc, may also subtend a small angle in each direction. In this analysis, the field-of-view (FOV) of the focal plane is assumed to be square and to extend +/−0.4° (+/−0.007 radians) in each direction from its center to its corners. The telescope projects the center of the focal plane, (x=0, z=0) along the y-axis. If the EFL of the telescope is f, then the telescope projects the line of sight (LOS) from each point (x,z) in the focal plane in the direction defined by the angles:

$$A = \arcsin(z/f), B = \arcsin(x/f) \quad [1]$$

The telescope collimates the line of sight (LOS) from each point in the focal plane into a direction I(A,B). In this analysis, vector quantities are typeset as boldfaced; their components are enclosed in bold brackets. The center of the focal plane, for which A=0, B=0, is projected onto the scan mirror along the direction defined by:

$$I(A=0,B=0) = [0,1,0] \quad [2]$$

Third and higher order terms in A and B are no greater than $(0.007 \text{ radian})^3 = 3.4 \times 10^{-7}$ radian and are neglected in this analysis. In this approximation, the telescope projects an arbitrary point (x,z) in the focal plane into a LOS, I(A,B) given by:

$$I(A,B) = [B, 1\tfrac{1}{2}(A^2+B^2), A] \quad [3]$$

The scanning system has a plane scan mirror 818 with an elliptical cross-section mounted on a two-axis gimbal system. The inner gimbal axis 820 coincides with the long axis of the ellipse and is perpendicular to the mirror's normal vector N. The outer gimbal axis 824 is perpendicular to the inner axis 820 and parallel to the east/west axis (x-axis) of the spacecraft. Rotation about the outer gimbal axis 824 causes the orientation of the inner gimbal axis 820 to rotate in the y/z plane. The outer gimbal angle (oga) is defined to be the angle between the y-axis and inner gimbal axis 820. Rotation about the inner gimbal axis 820 causes the orientation of the scan mirror's normal vector N, to rotate in the plane perpendicular to the outer gimbal axis 824. The inner gimbal angle (iga) is defined to be the angle between the scan mirror's normal vector N and the y/z plane. The normal vector is, therefore, a function of the two gimbal angles, N(iga, oga). The rays from an arbitrary point in the focal plane are collimated into a LOS, I(A,B), that is a function of the two field angles, A and B. The reflected LOS, R(A,B, iga,oga), is a function of the two field angles, A and B, and the two gimbal angle, iga and oga. The incident vector I, the reflected vector R, and the mirror's normal vector N, are related by the standard equation:

$$R(A,B,iga,oga) = I(A,B) - 2N(iga,oga)\{N(iga,oga)*I(A,B)\} \quad [4]$$

where N(iga,oga)*I(A,B) is the scalar product of the two vectors.

To find the general equation for N(iga,oga), consider the state in which oga=0, where the outer gimbal axis coincides with the y-axis (the optical axis of the telescope) and iga=0, so the normal vector lies in the y/z plane. In this position, the normal vector N points toward nadir:

$$N(0,0) = [0,0,1] \quad [5]$$

The scan mirror 818 may be rotated about the inner axis so that it assumes an arbitrary orientation in the x/z plane. The normal vector N as a function of iga is now:

$$N(iga, 0) = [\sin(iga), 0, \cos(iga)] = [S_i, 0, C_i] \quad [6]$$

where $S_i = \sin(iga)$ and $C_i = \cos(iga)$.

The home position of the scan mirror 818 may be defined as that position that reflects the line of sight (LOS) from the center of the FPA, I(A=0,B=0)=[0,1,0] to nadir, at R(A=0, B=0,iga,oga)=[0,0,1], in the center of the field of regard (FOR) that the system is required to scan. From Eq. [4], it is straightforward to show that the home position of the gimbal system is reached when iga=0° and oga=+45°, so that:

$$N(iga=0,oga=45) = [0, -0.707, +0.707] \quad [7]$$

The general equation for N(iga,oga), is determined by rotation of N(iga, 0) as defined by Eq [6] about the oga, which coincides with the x-axis of the spacecraft:

$$N(iga, oga) = [S_i, , B\sin(oga)C_i, , \cos(oga)C_i] \quad [8]$$
$$= [S_i, BS_oC_i, , C_oC_i]$$

where $S_o = \sin(oga)$ and $C_o = \cos(oga)$.

The general case for a reflected angle, R(A,B,iga,oga), from any position (A,B) in the FPA with any orientation of N(iga,oga), is determined by combining Eqs [3], [4], and [8]:

$$R(A,B,iga,oga) = [B,1\tfrac{1}{2}(A^2+B^2), A] - 2[S_i,-S_oC_i,C_oC_i]\{[S_i,-S_oC_i, C_oC_i]*[B, 1\tfrac{1}{2}(A^2+B^2), A]\} \quad [9]$$

When third and higher order terms in A and B are neglected, Eq. [9] reduces to:

$$R_x(A, B, iga, oga) = 2S_oS_iC_i - 2AC_oS_iC_i + B(1 - 2S_i^2) - \quad [10]$$
$$(A^2 + B^2)S_oS_iC_i$$
$$R_y(A, B, iga, oga) = (1 - 2S_o^2C_i^2) + 2AS_oC_oC_i^2 + 2BS_oS_iC_i -$$
$$\frac{1}{2}(A^2 + B^2)(1 - 2S_o^2C_i^2)$$
$$R_z(A, B, iga, oga) = 2S_oC_oC_i^2 + A(1 - 2C_o^2C_i^2) - 2BC_oS_iC_i -$$
$$(A^2 + B^2)S_oC_oC_i^2$$

Coordination of Electronic and Opto-Mechanical Scanning

The projection of the TDI axis 814 of the FPA onto the Earth at any gimbal angle may be found by differentiating Eq.[10] with respect to B. To simplify, apply double-angle trigonometric identities to iga:

$$dR(A, B, iga, oga)/dB = [1 - 2S_i^2 - 2BS_oS_iC_i, 2S_oS_iC_i - \quad [11]$$
$$B(1 - 2S_o^2C_i^2), -2C_oS_iC_i -$$
$$2BS_oC_oC_i^2]$$
$$= [\cos(2iga) - BS_o\sin(2iga),$$
$$S_o\sin(2iga) - B(1 - 2S_o^2C_i^2),$$
$$-C_o\sin(2iga) - 2BS_oC_oC_i^2]$$

Consider an array that is centered on the optical axis in the along-track direction (x-axis) of the focal plane, for which B=0. TDI transfers the charge packet in each row detectors in the FPA at an effective angular rate, dB/dt, equal to the linear rate of charge transfer, dx/dt, divided by the effective focal length of the telescope, f. If the gimbal axes are held stationary, then the projected image of a charge packet has the angular velocity, $V_{charge}$:

$$V_{charge} = (dB/dt)dR(A, 0, iga, oga)/dB \quad [12]$$
$$= (dB/dt)[\cos(2iga), S_o\sin(2iga), -C_o\sin(2iga)]$$

The projected line of sight from an array that is centered in the cross-scan direction (B=0) is:

$$R_x(A,0,iga,oga)=2S_oS_iC_i-2AC_oS_iC_i-A^2S_oS_iC_i$$
$$R_y(A,0,iga,oga)=(1-2S_o^2C_i^2)+2AS_oC_oC_i^2-\tfrac{1}{2}A^2(1-2S_o^2C_i^2)$$
$$R_z(A,0,iga,oga)=2S_oC_oC_i^2+A(1-2C_o^2C_i^2)-A^2S_oC_oC_i^2 \quad [13]$$

If the inner gimbal axis is rotated at an angular velocity of w, then:

$$dS_i/dt=wC_i \text{ and } dC_i/dt=-wS_i \quad [14]$$

Therefore, if the outer gimbal angle, oga, remains constant while the inner gimbal angle, iga, is rotated at a constant angular velocity, w, the line of sight of the optical axis changes at the rate:

$$dR(A, 0, iga, oga)/dt = \{dR(A, 0, iga, oga)/d(iga)\} \quad [15]$$
$$\{d(iga)/dt\}$$
$$= w\{dR(A, 0, iga, oga)/d(iga)\}$$

Combining Eqs. [13], [14], and [15] and applying the double-angle identities yields the result:

$$dR_x(A,0,iga,oga)/dt=2w\cos(2iga)[S_o-AC_o-\tfrac{1}{2}A^2S_o]$$
$$dR_y(A,0,iga,oga)/dt=2w\sin(2iga)[S_o^2-AS_oC_o-\tfrac{1}{2}A^2S_o^2]$$
$$dR_z(A,0,iga,oga)/dt=-2w\sin(2iga)[S_oC_o-AC_o^2-\tfrac{1}{2}A^2S_oC_o] \quad [16]$$

The angular velocity of the projection of a moving charge packet in the center of the focal plane, where A=0 and B=0 can be canceled by the opto-mechanical scan velocity when:

$$V_{charge}+dR(0,0,iga,oga)/dt=0 \quad [17]$$

This is the condition where the electronic and opto-mechanical scan rates of the charge packet cancel in object space. It is possible to achieve this cancellation throughout the two-dimensional field of regard because $V_{charge}$ and dR(0,0,iga,oga)/dt remain parallel for all values of iga and oga. Combining Eqs. [12], [16], and [17] yields the result:

$$\{dB/dt+2wS_o\}[\cos(2iga), S_o\sin(2iga), -C_o\sin(2iga)]=0 \quad [18]$$

Therefore, for each scanning arc, the angular velocity, w, of the inner axis should be set equal to the following value, a function of the outer gimbal angle, oga:

$$w=-(dB/dt)/(2S_o)=-(dx/dt)/(2fS_o) \quad [19]$$

Note that the value of w remains constant for each arc but varies from arc to arc as a function of the outer gimbal angle, oga.

Errors Due To Velocity Mis-Match in Cross-Scan Direction

When a linear FPA is centered in the along-scan direction, B=0, but A assumes values that span the field of view (FOV). According to this embodiment, A ranges between +/−0.007 radians, corresponding to +/−0.40 in object space and +/−250 km on the Earth's surface. When A is non-zero, there is a slight mis-match between the electronic and opto-mechanical scan rates. The opto-mechanical rate is too fast at the outer radius of the scanning arc (on the northern side, as shown in FIG. 7) and too slow at the inner radius. The velocity of the LOS vector, as a function of A, d[R(A,0,iga, oga)]/dt, may be compared to its value at the center of the array by using Eq. [16].

$$dR(A,0,iga,oga)/dt=[1-A\cot(oga)-2A^2]dR(0,0,iga,oga)/dt \quad [20]$$

The worst-case occurs for detectors elements at the end of the FPA, where A=+0.0070, when the AGSI is scanning the South Pole, for which oga=45°−½(8.7°)=40.65°. In this worst case, the electronic and opto-mechanical scan rates are mis-matched by a scan rate error of less than 1%:

$$\text{Worst-case scan rate error}=Aw\cot(40.65°)+\tfrac{1}{2}A^2=[(0.0070)(1.165)+\tfrac{1}{2}(0.0070)^2]w=+0.0082w \quad [21]$$

The number of contiguous pixels integrated in the TDI process varies from channel to channel. For this embodiment of the present invention, the largest value of N, the number of pixels to be integrated by TDI, is N=20. The worst-case value of RMS blur due to this velocity error, expressed as a fraction of a pixel's dimension, is:

$$\text{Worst-case RMS along-scan blur} = (0.0082)(20)/(12^{1/2}) \quad [22]$$
$$= 0.047 \text{ pixel}$$

Since the RMS blur induced by this mis-match is less than 5% of one pixel, it is a small source of image quality degradation.

Variation of Reflection Angle in a Single Scan Line

In the thermal IR channels, each mirror in the optical train emits background radiation that contributes to all signals measured by the detectors. This background from each optical element is proportional to its emissivity and increases with temperature according to Planck's law. Space looks, taken at the ends of each scan line when looking past the Earth into space, are used to measure the dark current due to instrumental background. This background is then subtracted from the raw scene data to determine the net radiance from the Earth. All components of the background due to thermal radiation from within the instrument are properly subtracted from the signal whenever they remain constant during a single scan line. All optical elements have temperatures that remain virtually constant during a single scan line, and all except the scan mirror 818 reflect the radiation from the scene in a fixed orientation, so their emissivities also remain constant. The scan mirror 818, however, reflects radiation at a variable angle over the course of a scan line. When the scan mirror's emissivity varies as a function of the reflection angle, it creates a bias in this background subtraction process that is proportional to the difference in emissivity between the reflection angle of the scene measurement and that of the background measurement. Therefore, variation in the reflection angle within a scan line is more troublesome that variation in the reflection angle from line to line.

The reflection angle of the optical axis of the imager according to this embodiment, for which A=0 and B=0, can be determined from:

$$\text{Reflection angle} = \arccos\{N(iga, oga)*I(0,0)\} = \arccos(S_o C_i) \quad [23]$$

The arc that passes through the Equator is defined by oga=45°. Along this arc, iga varies from iga=0° at the center of this arc to iga=+/-8.7°/$2^{1/2}$=+/-6.2° at the Earth's limb. The variation of the reflection angle between the center of this single arc through the Equator on the Earth's surface is:

$$\begin{aligned}\text{Reflection angle variation} &= \arccos\{\sin(45°)\cos(0°)\} - \\ &\quad \arccos\{\sin(45°)\cos(6.2°)\} \\ &= 45° - 45.3° \\ &= -0.3°\end{aligned} \quad [24]$$

In contrast, the reflection angle of the prior art GOES Imager's scan mirror varies by 8.7°, from 40.65° at the western limb to 49.35° at the eastern limb, in a single west-to-east scan line across the Equator. The present invention's reflection angle increases by 8.7° from North Pole to South Pole, but each successive arc across the Earth's surface is bracketed by space-viewing measurements that measure the dark current at nearly the same scan mirror reflection angle. Therefore, the shading that is present in the uncalibrated prior art GOES data is reduced by at least an order of magnitude by the alternative scan technique according to the present invention.

Optimal Alignment of Multiple FPA's

Preferably, an imager according to the present invention accommodates multiple linear FPA's covering several different spectral channels in each of its four focal planes. The focal planes are extended in the along-scan direction, so that FPA's can have values of B ranging from -0.0070 to +0.0070. Each FPA is properly oriented with its TDI axis along the direction of the opto-mechanical scan.

Figure 13:
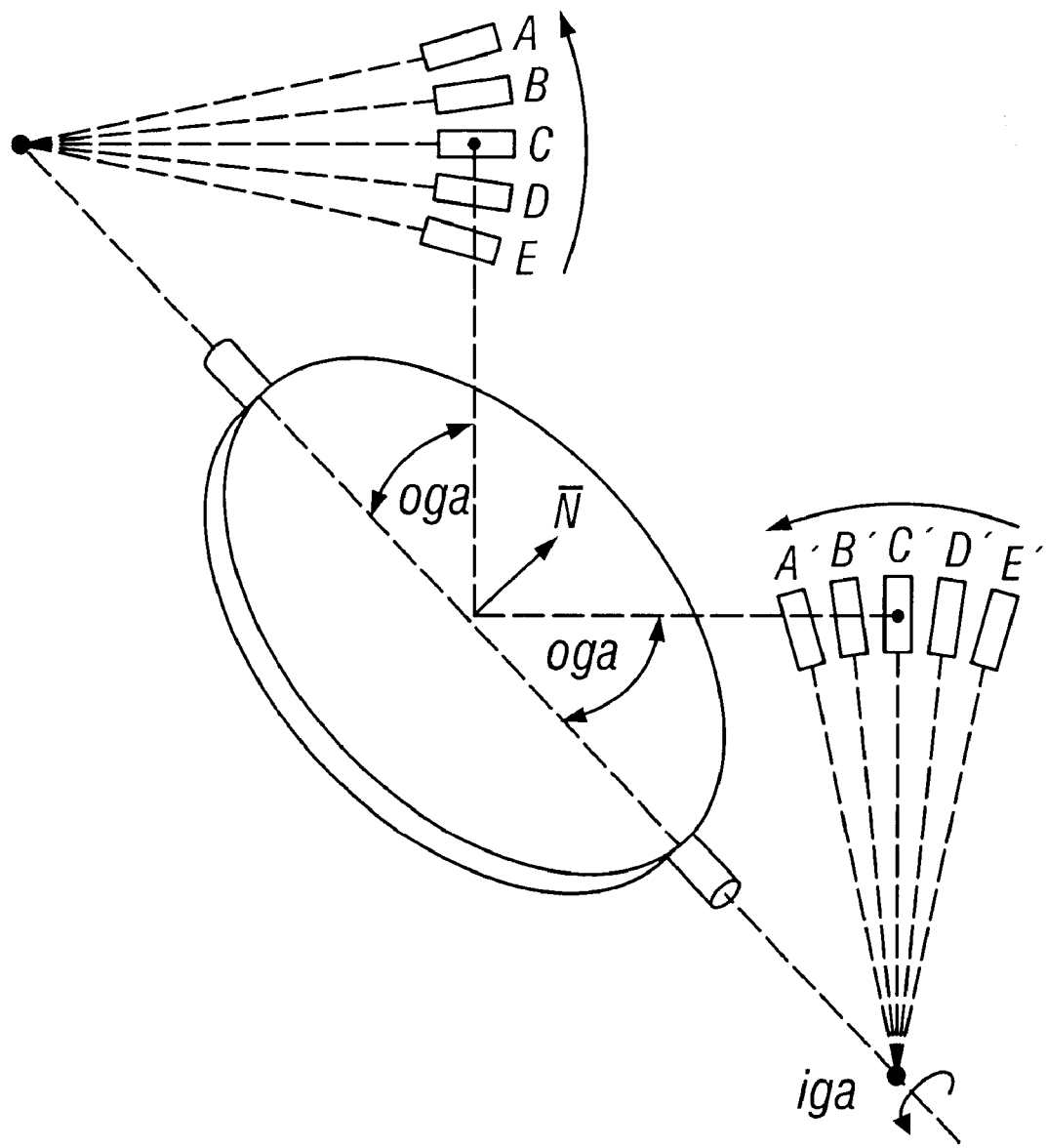
FIG. 13 illustrates geometry to accommodate multiple linear FPA's covering several different spectral channels.

Rotation about the inner gimbal axis projects a fixed line of sight from the telescope into a conical arc across the Earth's surface. Due to the reversibility of optical systems, this rotation also projects the line of sight from a fixed point on the Earth's surface into a conical arc in the focal plane of the telescope. Therefore, the best co-registration among the linear FPA's is achieved when they are aligned with their cross-scan axes pointing toward the axis of the cone, like the spokes of a wheel. This geometry is illustrated in FIG. 13.

The projections of all of the FPA's, A through E, are aligned with their cross-scan axes converging on the extension of the inner gimbal axis. When the iga=0°, the LOS from the each array is reflected into the corresponding FOV, A' through E'. When the iga is rotated in the positive direction, the central array, C, is scanned from C' to B' to A', along an arc as previously described. In this radial focal plane alignment, all of the other FPA's will also scan in sequence through the same arc with their TDI axes along the direction of scan.

The optimal FPA alignment varies as a function of the oga. The following analysis assumes that this alignment is optimized at oga=45°, the arc that scans the Equator. In this configuration, all of the FPA's are properly aligned when scanning through the Equator, but they become progressively more misaligned at higher latitudes, reaching their worst case mis-alignment at the poles, where oga=45°+/-4.35°.

Consider a FPA that is centered in the along-scan direction, so that B=0. The telescope projects this FPA into a LOS, I(A,0), where A ranges from -0.0070 to +0.0070 to cover the cross-scan width of the array. I(A,0) is determined by setting B=0 in Eq. [3]:

$$I(A,0) = [0, 1\tfrac{1}{2}A^2, A] \quad [25]$$

When iga=0, the scan mirror's normal vector, determined from Eq. [6], is:

$$N(0, oga) = [0, BS_o, C_o] \quad [26]$$

The reflection of I(A,0) from the scan mirror into object space is:

$$R(A,0,0,oga) = [0, 1\tfrac{1}{2}A^2, A] - 2[0, -S_o, C_o]\{[0, -S_o, C_o]* \\ [0, 1\tfrac{1}{2}A^2, A]\} \quad [27]$$

The components of Eq. [27] are:

$$R_x(A,0,0,oga) = 0$$

$$R_y(A,0,0,oga) = (1 - 2S_o^2) + 2AS_o C_o - \tfrac{1}{2}A^2(1 - 2S_o^2)$$

$$R_z(A,0,0,oga) = 2S_o C_o + A(1 - 2C_o^2) - A^2 S_o C_o \quad [28]$$

We now wish to determine the proper alignment for a FPA displaced by an angle B in the along scan direction. An angular displacement of B corresponds to a rotation about the inner gimbal axis from iga=0 to:

$$iga = -B/(2S_o) \quad [29]$$

Combining Eqs. [8] and [29] and using the second-order approximations for $S_i$ and $C_i$, the scan mirror's normal vector becomes:

$$N(-B/(2S_o), oga) = [-B/(2S_o), -S_o + B^2/(8S_o), C_o - B^2 C_o/(8S_o^2)] \quad [30]$$

The incident LOS that is projected onto the same footprint on the Earth's surface may be found by combining Eqs. [28] and [30] with the inverse of Eq. [4]:

$$I(A, B, -B/(2S_o), oga) = R(A,0,0,oga) - 2N(-B/(2S_o), oga)\{N(-B/(2S_o), oga)*R(A,0,0,oga)\} \quad [31]$$

Neglecting third and higher order terms in A and B, this equation becomes:

$$I_x(A, B, -B/(2S_o), oga) = B - ABC_o/S_o = B - AB\cot(oga)$$

$$I_y(A, B, -B/(2S_o), oga) = 1\tfrac{1}{2}(A^2 + B^2)$$

$$I_z(A, B, -B/(2S_o), oga) = A + 2B^2 C_o/S_o = A + \tfrac{1}{2}B^2 \cot(oga) \quad [32]$$

The angular alignment for the cross-scan axis of the array in the focal plane (the x-z plane) can be found by differentiating $I_x$ and $I_z$ with respect to the cross-scan variable, A.

Optimal tilt angle=$[dI_x/dA]/[dI_z/dA]$=$-B$ cot($oga$) [33]

Therefore, optimal tilt angle between each FPA and the z-axis, in radians, equals Bcot(oga). To scan each FPA over the same area on the Earth's surface, the center of each array (A=0) should be located at:

Optimum array center=$[I_x=B, I_z=\frac{1}{2}B^2 \cot(oga)]$ [34]

Each FPA should be tilted to satisfy Eq [33] and offset to satisfy Eq [34] on the central arc, that passes through nadir and scans the Equator, for which oga=45°. If the FPA's are all parallel to one another (and to the z-axis), then the maximum tilt error occurs for FPA's at the edges of the focal plane, where B=+/−0.007 radian, and for oga=40.65°, the arc that scans through the South Pole. This worst-case tilt angle error, in radians, is:

Worst-case tilt error (parallel FPA's)=+/−$B$ cotan(40.65)=+/−0.0070(1.165)=+/−0.0082 [35]

When TDI is implemented over 20 consecutive pixels, the worst-case RMS cross-scan blur, expressed as a fraction of a pixel, is:

Worst-case cross-scan blur(parallel FPA's)=(0.0082)(20)/($12^{1/2}$)= 0.047 pixel [36]

This cross scan blur associated with parallel FPA's is probably tolerable, but it can be reduced by tilting the arrays to satisfy Eq [33]. With this radial focal plane alignment, the maximum tilt error also occurs at the South Pole, but it is reduced to $$\text{Worst-case tilt}_{error} \text{ (radial FPA's)} = +/-B[\cot(40.65)-1] \quad [37]$$
$$= +/-0.0070(1.165-1)$$
$$= +/-0.00116$$

The RMS cross-scan blur, expressed as a fraction of a pixel, becomes:

$$\text{RMS cross-scan blur (radial FPA's)} = (0.00116)(20)/(12^{1/2}) \quad [38]$$
$$= 0.0067 \text{ pixel}$$

This cross scan blur, less than 1% of the pixel's dimension, is negligible when the FPA's are aligned radially. Comparison of Eq [36] against Eq [38] shows that the worst-case blur circle due to the off-axis FPA's tilt error is about seven times smaller if they are aligned radially rather than in parallel.

A preferred feature of an imager according to the present invention is channel-to-channel co-registration i.e., to have corresponding pixels in its different spectral bands of its processed imagery measure the radiance from same area on the Earth's surface. The present invention imager achieves co-registration in its processed imagery by scanning with detector elements that subtend smaller instantaneous fields of view (IFOV's) that those of the pixels in the image, and then re-sampling to the image grid registered to the Earth's surface. Although this approach allows the hardware co-registration requirements to be relaxed, it is still desirable to have corresponding pixels in the different FPA's scan the IFOV to the greatest extent possible.

One aspect of hardware co-registration is that FPA's are aligned in the cross-scan direction so that the centers of corresponding detector elements in each array are scanned over the same IFOV in object space. If all of the FPA's are aligned in parallel with their centers at $I_z=0$, then, from Eq.[34], the center of each FPA will be offset from its proper position by $\frac{1}{2}B^2$ cot(oga). At the edges of the focal plane (B=+/−0.0070), and at the south Pole, the worst-case uncorrected cross-scan offset will be:

$$\text{Worst-case cross-scan} \quad [39]$$
$$\text{offset (parallel FPA's)} = \frac{1}{2}(0.0070)^2(1.165)$$
$$= 29 \text{ micro-radians}$$

This offset is equivalent to two re-sampled visible pixels (each pixel subtends 14 micro-radians=½ km at nadir) so it is undesirably large. This offset is reduced by optimizing Eq. [34] at oga=45°. The worst case cross-scan offset for radial FPA's also occurs at the edges of the focal plane, for which B=+/−0.0070, and at South Pole, where B cotan(40.65)= 1.165. In this case, the cross-scan offset from the center of the focal plane, at B=0, to the edges at B=+/−0.007 is:

$$\text{Worst case cross-scan} \quad [40]$$
$$\text{offset (radial FPA's)} = \frac{1}{2}(0.0070)^2(1.165-1)$$
$$= 4 \text{ micro-radians}$$

This is 29% of the visible pixels in the imagery, so some re-sampling would be desired to improve worst-case performance for the visible array. It should be noted, however, that the imager's visible range FPA's need not fill the entire along scan dimension of the focal plane, from B=−0.007 to B=+0.007. The IFOV's at longer wavelengths tend to be larger. Therefore, the worst-case results are probably unduly pessimistic.

If the FPA's are parallel, there is also a time shear in those pixels for which both A and B are non-zero. In other words, if all elements of an array are sampled simultaneously, then the pixels are offset in the along-scan direction. This shear can be derived from the second term of $I_x(A,B,-B/(2S_o),oga)$ that equals −AB cot(oga). The worst-case error occurs at the corners of the array, where both A and B have values of +/−0.0070, and at the south Pole, where cot(oga)=1.165. In this case, the along-scan shear is:

$$\text{Along-scan shear (parallel FPA's)} = +/-(0.0070)^2(1.165) \quad [41]$$
$$= +/-57 \text{ micro-radians}$$

This offset is equivalent to about four re-sampled visible pixels. If the FPA's are all parallel to the z-axis in the focal plane, then those FPA's for which B is non-zero will require staggered sampling (like the visible arrays in the GOES Imager) which would be difficult to implement in an array using TDI.

Tilting the FPA's in this manner also reduces the worst-case along-scan shear to:

$$\text{Along-scan shear (tilted FPA's)} = +/-(0.0070)^2(1.165-1.00) \quad [42]$$
$$= +/-8 \text{ micro-radians}$$

Some correction of this error is required in the re-sampling algorithm to achieve good co-registration in the Earth imagery in the visible (14 micro-radians) and SWIR (28 micro-radians) channels.

Preferred Telescope Configuration

Figure 11:
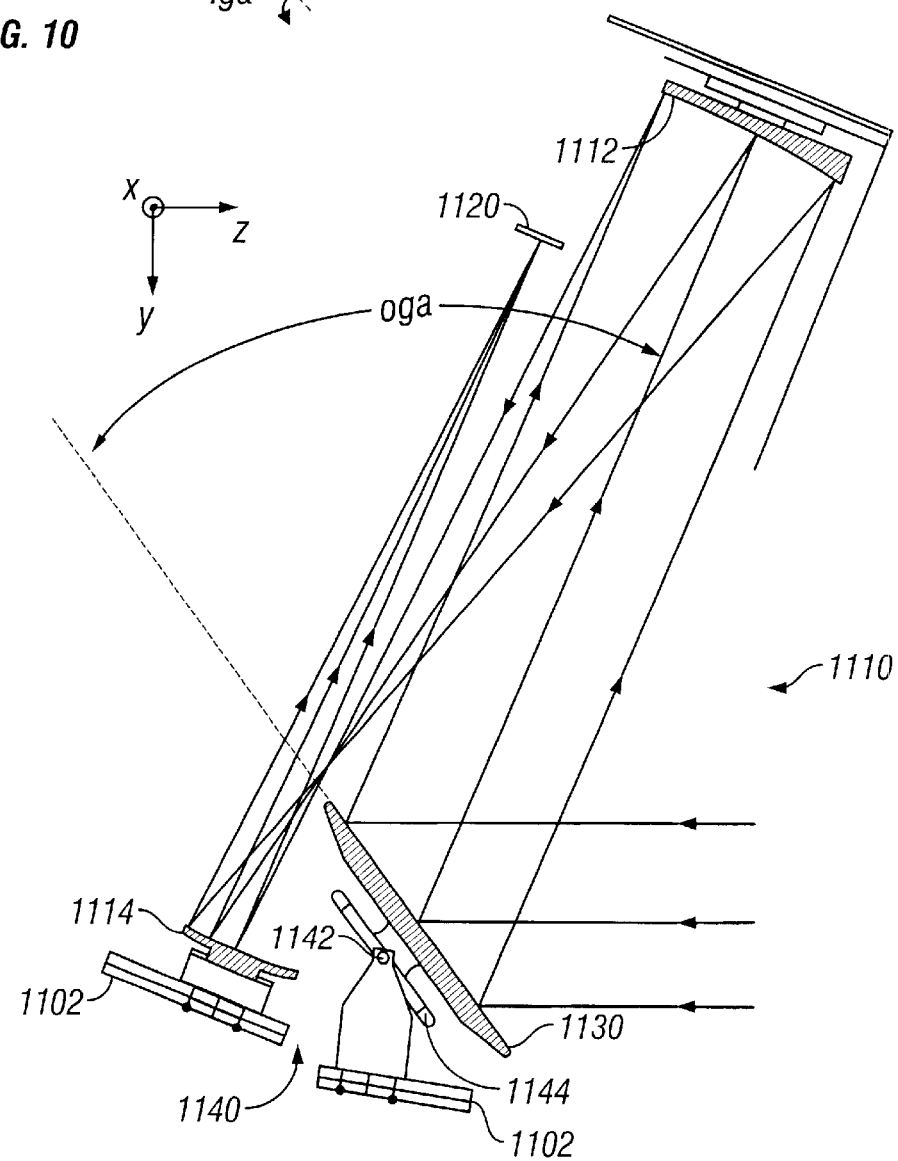
FIG. 11 illustrates an opto-mechanical system according to a preferred embodiment of the present invention for implementing a scan pattern across the full Earth disk from geostationary orbit.

Referring to FIG. 11, an opto-mechanical system according to another embodiment of the present invention for implementing a scan pattern across the full Earth disk from geostationary orbit is illustrated. The primary mirror 1112 and secondary mirror 1114 form a telescope 1110. In contrast to the embodiment of FIG. 6, the optical axis of this telescope 1110 is tilted 30 degrees from the y-axis in the y-z plane. The along-scan axis of the FPA 1120 is parallel to the E/W axis of the spacecraft (x-axis). In this system, the oga is 60 degrees when the LOS is pointed to nadir. The scan mirror 1130 is an optical flat with an elliptical cross-section that is mounted on a gimbal system 1140 with two perpendicular axles 1142, 1144. The outer axle 1142 is attached to the body 1102 of the instrument parallel to its x-axis and perpendicular to the LOS of the telescope. The projection of the cross-scan axis of the FPA 1120 onto the scan mirror 1130 is always perpendicular to the outer axle 1142 of the gimbal. The outer gimbal axle 1142 is parallel to the TDI axis of the FPA 1120. The inner axle 1144 of the gimbal 1140 rotates about the x-axis of the spacecraft and assumes different orientations in the y/z plane. The scan mirror 1130 is attached to the inner axle 1144 with the normal vector of its mirrored surface perpendicular to the inner axle 1144. The major axis of its elliptical cross-section is parallel to the inner axle 1144.

The geometry of the FIG. 11 system is preferred to that of FIG. 6 for several reasons.

First of all, the angle of reflection is smaller. Consequently, the reflection introduces less spurious polarization. Second, the major axis of the scan mirror ellipse can be made shorter. As a result, the mass and angular momentum of the scan mirror are reduced. Additionally, rotation of the image is less. This may be stated equivalently as there being less rotation of the projection of the FPA pixels onto the scene.

Figure 12:
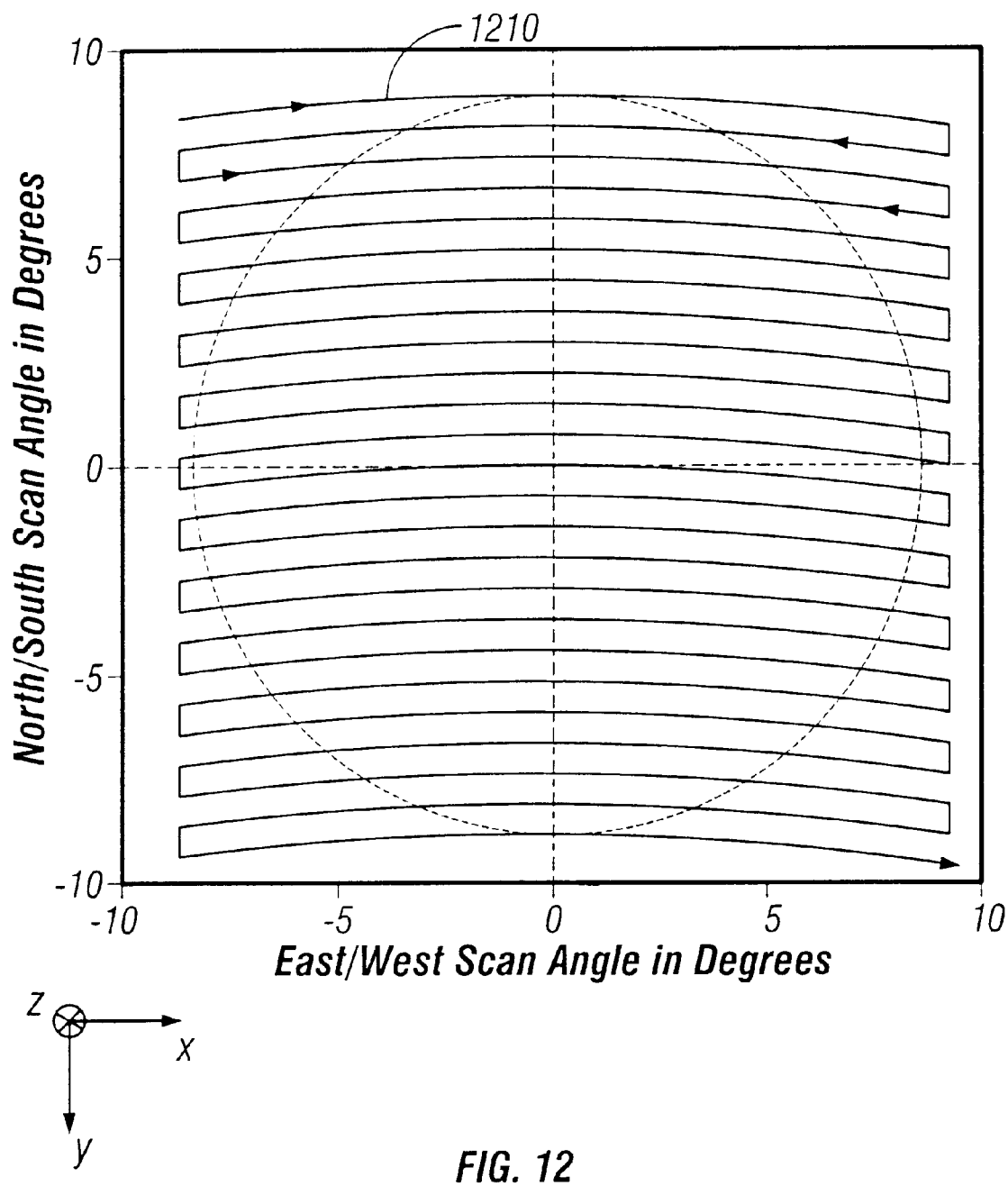
FIG. 12 illustrates a bi-directional scan pattern for mapping the full Earth disk that is generated by the system of FIG. 11.

Referring to FIG. 12, a bi-directional scan pattern 1210 for mapping the full Earth disk that is generated by the system of FIG. 11 is illustrated. Comparing the scan pattern of FIG. 12, with that of FIG. 7, the arcs in FIG. 12 are more nearly straight lines. This is yet another way of characterizing that image rotation is reduced according to this preferred embodiment.

Working Example

A geosynchronous imager according to the present invention has been designed to satisfy two sets of requirements: those for a next-generation operational weather imager and those for a geostationary scientific instrument. It is to be mounted on a three-axis stabilized geostationary satellite. It has 18 spectral channels ranging from 0.47 to 13.3 $\mu$m. It scans the full Earth disk, from geosynchronous orbit, in less than 15 minutes while simultaneously scanning smaller frames at higher rates. To achieve the required coverage rate, the exemplary geosynchronous imager scans with long linear arrays that subtend 0.8°. It has a plane scan mirror in object space, mounted on a two-axis gimbal system, followed by a three-mirror, off-axis, all-reflective telescope. Dichroic beam splitters allow the geosynchronous imager to have four co-registered focal planes in four different wavelength bands, each of which has several linear focal plane arrays (FPA's) that are scanned sequentially over the Earth's surface. Both high angular resolution and high radiometric resolution are satisfied by time delay & integration (TDI) in several of these FPA's. The outputs from 20 detector elements in a row are summed (N=20) to achieve adequate radiometric resolution in one spectral band.

Because it utilizes TDI, the geosynchronous imager according to this example cannot tolerate the image rotation that occurs in the prior art GOES scan geometry. In order to scan with a single plane mirror on a two axis-gimbal, it was necessary to use a heretofore unknown scanning geometry to maintain the direction of scan parallel to the TDI axis of the array in spite of image rotation. Scanning geometry according to the above description overcomes this problem.

The geosynchronous imager scans the Earth in a series of east/west arcs whose curvature is matched to the image rotation in a way that maintains the opto-mechanical scan velocity along the TDI axis of the focal plane. Each arc is scanned by rotating the scan mirror at a constant angular velocity about its inner gimbal axis while the outer axis remains fixed. The scan mirror is rotated about its outer axis during the turn-around time between scan arcs. The magnitude of the angle of reflection varies by less than 0.5° over a single arc of the geosynchronous imager's scan pattern. Space measurements taken at the ends of each arc are used to subtract the instrument's background from the raw Earth data, so the net signals have only a small bias due to the angular dependence of the scan mirror's emissivity.

Techniques to Mitigate Mis-Registration & Velocity Mis-Match Problems

Additional aspects of the invention include a number of techniques for mitigating mis-registration and velocity mis-match problems. These aspects are described as follows.

One technique is to use several sub-arrays in each spectral channel to scan the cross-scan dimension of the FPA. Progressively higher electronic TDI scan rates (or larger along-scan detector pitch) are used going from the inner radius of the scanning arc to the outer radius. The TDI scan rate for each sub-array is constant, but is different from that of the other sub-arrays. The effectiveness of this technique is illustrated by considering the example of an imager having a +/−1.0 deg cross-track FOV with N(TDI)=32. The fractional error=A cot(oga+45), and the worst case occurs at south Pole, where oga=−4.35 deg.

For a single TDI rate A=0.0087 at ogi=0 (45 deg), scan rate=0.707*TDI rate
Fractional error=(0.0175)(1.165)=0.0203
Blur=32*0.0203*0.289=0.19 pixel With four sub-arrays, each with a different TDI rate. Set TDI rates @ogi=0 (45 deg) Scan rates=Sin(44.25, 44.75,45.25,45.75)*(1.414*nominal TDI rate)
Considering worst case at the South Pole:

Mis-match = {S(44.25)S(40.65)}/{S(39.9)S(45)}

= 1.002 (ratio at center of sub array)

Mis-match = (0.0175/4)(1.165)

= 0.005 (from center to edge of sub array)

Worst mis match=0.007
Blur=32*0.007*0.289=0.065 pixel

This represents a factor of three improvement over single FPA.

Another technique is to stagger the timing of tilted sub-arrays. If it is assumed that multiple sub-arrays are used, then staggering the timing of tilted sub-arrays improves along-scan registration when scanning north or south of the central arc. If all arrays are sampled simultaneously in the central arc, then when sampling a smaller arc (S. Pole) the sub-array on the inner radius of the leading channel (the one that is scanned over the FOV first) should be sampled before the outer sub-array. In the trailing channel, the outer sub-array should be sampled before the inner sub-array. At the North Pole, the timing is opposite: The outer leading array and the inner trailing array should be sampled first.

Yet another technique is an alternative to the two described above. It is possible to deliberately introduce distortion into the optical prescription so that the effective focal length is slightly shorter at the side of the focal plane that images the outer radius of the arc than it is at the opposite side (that images the inner radius of the arc). This approach can equalize (at least to first order) the scan velocities on the focal plane, allowing constant detector pitch and constant TDI rate to be used over a wider array. In this implementation, multiple arrays would be aligned parallel to one another and not radially as illustrated in FIG. 13.

Summary of Advantages

The scanning method and apparatus according to the present invention, including gimbal geometry, focal plane layout, and associated scanning technique, has a number of unique advantages over the prior art.

A geosynchronous imager according to the present invention can scan its FOR over the entire surface of the Earth with a single plane scan mirror on a two-axis gimbal. When the scan motion is implemented, the projection of the focal plane maintains a fixed orientation with respect to the scan velocity. This feature allows the electronic scan velocity of a TDI array to be matched to the opto-mechanical scan velocity of the LOS so that TDI can be implemented over the entire FOR without image blurring. Although this ideal co-ordination only occurs at the center of the focal plane (there is some), the worst-case image blurring that results from mis-match at the edges of the focal plane is a small fraction of a pixel's dimension. No prior art imaging scheme can match this combination of image quality and radiometric quality, minimization of the angular momentum required to implement a scan, and simplicity of implementation.

Another advantage is that the scanning technique according to the present invention is easy to implement. The outer gimbal axis is offset between scan lines, but remains stationary during the data-taking portion of each scanning arc, when the inner gimbal axis rotates at a constant angular velocity (a different velocity for each arc).

A further advantage of the present invention is that the magnitude of the reflection angle varies by only a fraction of one degree during a single scanning arc. This allows space references to be taken at the beginning and end of each arc at virtually the same reflection angle that is applicable to the Earth imagery. This feature suppresses shading due to the angular dependence of the scan mirror's emissivity.

Yet another advantage of the present invention is that the radial focal plane layout allows multiple FPA's to be located in each focal plane. The orientation of the TDI axes of the FPA's and the co-registration among the FPA's are ideal at the Equator and are quite acceptable at the poles.

Imaging From a Moving Platform

The foregoing portion of this disclosure analyzes an optical scanning method and apparatus for producing images under conditions where there is no relative motion between the imager and the scene, i.e., an Earth-viewing imager on a three-axis stabilized geostationary satellite. However, the scope of the present invention is not limited to such a scenario. The geostationary examples set forth herein represent imaging when there is no significant relative motion between the imager and its observation target. These appear to be the most commercially promising uses of the invention but are not its only useful application.

The following discussion addresses imaging from a moving platform. The specific example is an Earth-viewing, three-axis stabilized satellite in low-Earth orbit (LEO). The parameters selected for this analysis are arbitrary. The same approach is generally useful for observations from any platform moving at a constant velocity and a constant distance from the scene to be imaged.

It is assumed that the spacecraft yaws to maintain a fixed orientation with respect to the direction of the ground point velocity, which is due to both the spacecraft's orbital motion and the Earth's rotation. This angle is at most a few degrees away from the orbital plane. Of course, the spacecraft not only revolves around the Earth, but also pitches once per orbit, to maintain a fixed orientation with respect to nadir.

The relative motion between the imager's platform and its observational target is used to scan in the along-track direction. The conical scan, nominally perpendicular to the velocity of the imager's platform, generates a series of arcs. In order to implement a bi-directional scan (the most efficient approach), it is necessary to scan the oga from front to rear during the active scan, while simultaneously scanning the iga. The oga is then stewed rapidly from rear to front during the turn-around period between arcs. If this motion were not implemented, there would be gaps and areas of overlap in the coverage pattern. Accordingly, this embodiment does not have the advantage of maintaining a fixed oga during the active scan, as is achievable in the above-described geostationary embodiments. All other advantages of the present invention are applicable to this embodiment, however. Also, the range of the oga's mechanical scan is small, equal to one-half the width of the scan line. To enable use of TDI, the focal plane is populated with long linear arrays of photo-detectors. Each linear array has a spectral filter to determine its bandpass. The different spectral bands are scanned sequentially. It is preferred that the scan velocity of a point on the ground remain perpendicular to the long axes of the array. This feature improves the accuracy to which the spectral characteristics of a pixel on the ground, i.e., the ratio of radiances among multiple spectral bands, can be determined.

The following coordinate system is assumed: The +z-axis points toward nadir; the motion of the point on the ground is in the −x direction; and the y-axis is perpendicular to the other two axes, completing a right-handed coordinate system.

The telescope's optical axis points forward, 5 degrees toward zenith (an arbitrarily selected angle) so that its vector is [+0.9962, 0, −0.0872]. The telescope projects the long axis (cross-scan) of the FPA in the x-z plane, and the along-scan axis (the TDI-axis, if TDI is used) parallel to the y-axis. Assuming that the FOV subtends=/−1.5 deg from the optical axis in the cross-scan direction, the vectors from the edges of the FOV are: [+0.9983, 0, −0.0610] and [+0.9936, 0, −0.1132].

The scan mirror is mounted on a two-axis gimbal. The outer axis of the gimbal is parallel to the y-axis of the spacecraft. The inner axis is constrained to the x-z plane and coincides with the long axis of the elliptical cross-section of the plane scan mirror. The orientation of the telescope and gimbal axes is different in this embodiment than in the prior one, but the same basic telescope-to-scan mirror geometry is used as in the geostationary system described above. The scan mirror's normal vector, [Nx, Ny, Nz] is defined by:

$Nx=-\cos(iga)\cos(oga)$ $Ny=+\sin(iga)$ $Nz=+\cos(iga)\sin(oga)$

The oga is defined as the angle between the inner gimbal axis and the −x-axis of the spacecraft. The iga is defined as the angle between the normal vector and the x-z plane.

In the home position, iga=0 degrees and oga=45 degrees (the oga value having been selected arbitrarily). The normal vector at the home position is [−0.707, 0, +0.707]. In this position, the telescope's optical axis is reflected at an angle 5 degrees aft of the nadir. [−0.0872, 0, +0.9962]. The edges of the long axis of the array (cross-scan) are also reflected in the x-z plane, to [−0.0610, 0, +0.9983] and [−0.1132, 0, +0.9936].

The system scans in arcs, by rotating the iga in alternating directions, from −10 to +10 degrees, then from +10 to −10 degrees, etc. The iga is scanned at an angular rate of 4 deg/sec, taking 5 seconds to complete each arc. Approximately 0.6 seconds is allowed for the mirror to reverse its direction of rotation about the iga axis. During the active portion of the scan, the gimbal rotates about the oga axis (y-axis) to compensate for the motion of the spacecraft. At nadir, a point on the Earth's surface 5 degrees aft of the spacecraft has an apparent motion of 0.54 deg/sec in the −x direction. Therefore, the oga is scanned at a rate of −0.27 deg/sec. This oga rate is variable as a function of the iga angle and latitude of the Earth to match the ground track rate.)

Rotation about the oga produces an optical angular motion that is twice the oga rotation. Therefore, the oga is only required to rotate +/−0.675 degrees about its nominal position. Flex pivots can be used instead of an axle. Flex pivots eliminate the mechanical problems associated with a bearing and conduct heat more efficiently than bearings. It is also easy to use a cable to transfer power, data, etc. across the outer gimbal axis.

The average scan velocity of the line-of-sight from each pixel is about 6.15 deg/sec=107 mrad/sec. The dwell time for a Vis/NIR pixel that subtends 14.2 micro-radians is 132 micro-seconds. A TDI of 4–8 provides sufficient integration time on each pixel. The array is configured to perform the TDI integration in both directions, alternating on consecutive scan lines.

The foregoing imaging system is appropriate for imaging to meet the needs of a next generation visible/near IR remote sensing instrument, i.e., the next generation to the Thematic Mapper™ system, for a spacecraft operating according to the following parameters:

Altitude: 700 km + / −100 km (705 km; same as TM)

Inclination (98.2 deg; same as TM)

Cross-track swath width: 185–400 km (370 km; twice TM)

Cross-track swath angle = + / −14.65 deg

-continued

Velocity of nadir ground track on Earth's surface = 6.75–6.83 km/sec

Angular velocity of nadir ground track = 9.57–9.69 mrad/sec =

0.548–0.555 deg/sec

Angular velocity of ground track 15 deg fore/aft = 8.82–8.93 mrad/sec

Angular velocity of ground track 15 deg cross-orbit =

9.21–9.32 mrad/sec

Yaw angle between orbital plane and ground track velocity @ equator =

3.8 deg

According to these exemplary parameters two satellites are capable of providing 4-day coverage. Spectral band coverage is 4 visible/NIR (silicon photo-detectors) and up to 3 SWIR. The pixel size is in the ranges of 10–15 m for VNIR and 20–30 m for SWIR. The detector pitch is 12 microns for VNIR arrays (typical) and 24 microns for SWIR arrays (typical). The Angular IFOV @nadir is 14.2 micro-radians and the dwell time/pixel @nadir is 1.47 msec. The minimum aperture diameter (assuming that the Airy disk diam=IFOV @ 0.85 um) is 146 mm (or 5.75 in.). The EFL=846 mm=33.3 in. The aperture is f/#=5.8. The minimum effective VNIR integration time per pixel (for desirable SNR) is typically 0.5–1.0 msec, depending on bandwidth. The width of the image swath is about 37,000 VNIR pixels.

According to the foregoing example parameters, the detector element in the center of the array has a reflection angle that varies from 41.7 deg at the beginning of an arc to 40 deg at the center of the arc to 40.4 degrees at the end of the arc. This is a substantial improvement over an implementation according to the principles of the prior art Thematic Mapper, wherein the angle of reflection from the scan mirror that is seen by a single detector element varies by 15 degrees as the mirror scans from one side of the 30 degree-wide swath to the other. Thus, the angle of reflection from the scan mirror that is seen by a single detector element varies much less in a conical scan according to the present invention. This feature is very advantageous in the thermal IR wavelengths where emissivity of the scan mirror surface as a function of angle is significant.

Alternate Embodiments

The present invention is not limited to the bi-directional scanning. The bi-directional scan is believed to be the most efficient for most applications. However, the present invention may be practiced using single-directional scanning for those applications where it is necessary or appropriate. One way to implement single-directional scanning is to use the single mirror structure as described above and perform a rapid slew to fly back between scan arcs. Another option for implementing single-directional scanning is to use a double-sided mirror and to fly forward between arcs by speeding up rotation of the mirror during the inactive portion of the scan.

The embodiments described above are all in the space context, either geostationary or low Earth orbit (LEO). However, there is no reason that the structural combinations and techniques described here should be limited to space-borne applications. For example, the imager and imaging techniques according to the present invention may be implemented for machine vision, in medical imaging, for purposes of pollution detection, and in the field of intrusion detection (i.e., security).

The present invention has been described in terms of preferred embodiments, however, it will be appreciated that various modifications and improvements may be made to the described embodiments without departing from the scope of the invention. The present invention is limited only by the appended claims.

What is claimed is:

1. A method of scanning a field of view of an imager across a field of regard using a scan mirror mounted on a gimbal having an inner axis and an outer axis, the method comprising:

sweeping the field of view across the field of regard in a selected direction by rotating the gimbal about the inner axis while maintaining the gimbal at a fixed angle with respect to the outer axis;

progressing to a subsequent scan position by rotating the gimbal about the outer axis by a predetermined increment angle while maintaining the gimbal at a fixed angle with respect the inner axis;

repeating the act of sweeping such that the selected direction is chosen alternately from a first direction and a second direction that is opposed to the first direction; and repeating the act of progressing prior to each repeated act of sweeping;

wherein a line of sight of the imager is perpendicular to the outer axis, so that there is substantially no rotation, with respect to the instantaneous direction of scan, of an image formed on the imager.

2. An apparatus for scanning a two dimensional field of regard, the apparatus comprising:

a telescope having a focal plane and a field of view;

one or more image sensors disposed at the focal plane;

a single optically flat mirror disposed in the object space of the telescope;

wherein the flat mirror sweeps the field of view continuously across the field of regard while maintaining a fixed relationship between the rotational direction of scan and the projection of the telescope's focal plane.

3. The apparatus of claim 2, wherein the image sensors are configured to perform time delay and integration imaging.

4. The apparatus of claim 2, wherein the image sensors are configured to perform multi-spectral imaging.

5. The apparatus of claim 2, wherein the image sensors are configured to perform hyperspectral imaging.

6. An apparatus for scanning a two dimensional field of regard, the apparatus comprising:

a telescope having a focal plane and a field of view;

one or more image sensors disposed at the focal plane;

a single optically flat mirror disposed in the object space of the telescope; and a gimbal having an inner axis and an outer axis, the flat mirror being mounted on the gimbal;

wherein the flat mirror scans the field of view across the field of regard while maintaining a fixed relationship between the rotational direction of scan and the projection of the telescope's focal plane; and wherein the field of view covers the two dimensional field of regard via a series of conical arcs, each arc being scanned by rotation about the inner axis of the gimbal.

7. The apparatus of claim 6, wherein an active scanning portion of each conical arc is separated from an active scanning portion of the subsequent conical arc by a brief vertical deflection interval.

8. The apparatus of claim 7, wherein rotation about the outer axis of the gimbal is stepped during the vertical deflection interval.

9. The apparatus of claim 7, wherein rotation about the outer axis of the gimbal is fixed during the active scanning portion.

10. The apparatus of claim 7, wherein rotation about the inner axis of the gimbal remains substantially fixed during the vertical deflection interval.

11. The apparatus of claim 7, wherein rotation about the inner axis of the gimbal slews the scan back to a starting position during vertical deflection interval.

12. The apparatus of claim 2, wherein each conical arc is scanned at a constant angular velocity throughout the arc.

13. An apparatus for imaging a two dimensional field of regard, the apparatus comprising:

an imager having a field of view along a line of sight, the field of view being substantially smaller that the field of regard;

a scan mirror disposed so as to cast the line of sight onto the field of regard, the scan mirror being mounted on a gimbal having an inner axis and an outer axis;

wherein the line of sight, of the imager perpendicular to the outer axis, so that the scan mirror causes the line of sight to be scanned across the field of regard in a conical arc when the scan mirror is rotated about the inner axis with no rotation about the outer axis.

14. The apparatus of claim 13, wherein the imager comprises:

a telescope having a focal plane; and one or more image sensors disposed at the focal plane;

wherein the image sensors are configured to perform time delay and integration imaging.

15. The apparatus of claim 13, wherein the imager comprises:

a telescope having a focal plane; and one or more image sensors disposed at the focal plane;

wherein the image sensors are configured to perform multi-spectral imaging.

16. The apparatus of claim 13, wherein the imager comprises:

a telescope having a focal plane; and one or more image sensors disposed at the focal plane;

wherein the image sensors are configured to perform hyperspectral imaging.

* * * * *

UNITED STATES PATENT AND TRADEMARK OFFICE
CERTIFICATE OF CORRECTION

PATENT NO. : 6,555,803 B1  Page 1 of 2
APPLICATION NO. : 09/617372
DATED : April 29, 2003
INVENTOR(S) : James C. Bremer It is certified that error appears in the above-identified patent and that said Letters Patent is hereby corrected as shown below:

|  | | | |
|---|---|---|---|
|  | COLUMN 1, | LINE 41, | change "FPA'S" to --FPA's-- |
|  | COLUMN 3, | LINE 2, | change "crossed axes in the focal plane 14" to --crossed axes 14 in the focal plane-- |
|  | COLUMN 3, | LINE 14, | change "focal plane 14" to --crossed axes 14-- |
|  | COLUMN 3, | LINE 19, | change "crossed axes in the focal plane 14" to --crossed axes 14 in the focal plane-- |
|  | COLUMN 3, | LINE 27, | change "focal plane 14 is" to --crossed axes 14 are-- |
|  | COLUMN 4, | LINE 3, | change "4,the" to --4, the-- |
|  | COLUMN 6, | LINE 11, | after "as" and before "the" delete "a" |
|  | COLUMN 7, | LINE 19, | after "respect" and before "the" insert --to-- |
|  | COLUMN 7, | LINE 41, | after "smaller" change "that" to --than-- |
|  | COLUMN 8, | LINE 56, | at the end of the line, after "gimbal" insert --system-- |
|  | COLUMN 9, | LINE 2, | after "gimbal" insert --system-- |
|  | COLUMN 9, | LINE 31, | after "gimbal" insert --system-- |
|  | COLUMN 10, | LINE 8, | change "gimbal 842" to --gimbal system 840-- |
|  | COLUMN 14, | LINE 22, | change "+/-0.40" to --+/-0.4°-- |
|  | COLUMN 15, | LINE 15, | change "that" to --than-- |
|  | COLUMN 17, | LINE 59, | change "(IFOV's) that" to --(IFOV's) than-- |
|  | COLUMN 18, | LINE 19, | change "B cotan" to --Bcotan-- |
|  | COLUMN 18, | LINE 44, | change "comers" to --corners-- |
|  | COLUMN 22, | LINE 31, | change "stewed" to --slewed-- |
| CLAIM 1, | COLUMN 25, | LINE 18, | after "respect" and before "the" insert --to-- |
| CLAIM 13, | COLUMN 26, | LINE 27, | after "smaller" change "that" to --than-- |

UNITED STATES PATENT AND TRADEMARK OFFICE
CERTIFICATE OF CORRECTION

PATENT NO. : 6,555,803 B1
APPLICATION NO. : 09/617372
DATED : April 29, 2003
INVENTOR(S) : James C. Bremer It is certified that error appears in the above-identified patent and that said Letters Patent is hereby corrected as shown below:

CLAIM 13, COLUMN 26, LINE 32, delete the comma after "sight" and after "imager" insert --is --

Signed and Sealed this

Fourth Day of August, 2009

JOHN DOLL
*Acting Director of the United States Patent and Trademark Office*